United States Patent [19]
Kiyanagi et al.

[11] Patent Number: 6,028,902
[45] Date of Patent: Feb. 22, 2000

[54] CLOCK PHASE DETECTING CIRCUIT

[75] Inventors: Hiroyuki Kiyanagi, Sendai; Mitsuo Kakuishi; Takanori Iwamatsu, both of Kawasaki, all of Japan

[73] Assignee: Fujitsu Limited, Kanagawa, Japan

[21] Appl. No.: 08/828,419

[22] Filed: Mar. 28, 1997

[30] Foreign Application Priority Data

Sep. 10, 1996 [JP] Japan .................................. 8-238869

[51] Int. Cl.$^7$ ...................................................... H04L 7/00
[52] U.S. Cl. ........................... 375/355; 375/373; 327/2; 331/17
[58] Field of Search ..................................... 375/326, 327, 375/355, 376; 329/302, 308, 2; 327/141, 155, 157; 331/17

[56] References Cited

U.S. PATENT DOCUMENTS

| | | | |
|---|---|---|---|
| 5,537,419 | 7/1996 | Parr et al. ................................ | 375/355 |
| 5,703,905 | 12/1997 | Langberg ................................. | 375/232 |
| 5,862,191 | 1/1999 | Moridi ..................................... | 375/355 |

FOREIGN PATENT DOCUMENTS

| | | |
|---|---|---|
| 2-150145 | 8/1990 | Japan . |
| 7-22988 | 1/1995 | Japan . |
| 7-50623 | 2/1995 | Japan . |
| 7-59377 | 3/1995 | Japan . |

Primary Examiner—Amanda T. Le
Attorney, Agent, or Firm—Helfgott & Karas, P.C.

[57] ABSTRACT

A clock phase detecting circuit is provided which is arranged in a receiving section of a multiplex radio apparatus. Difference detecting unit detects the difference between input and output signals to and from an equalizing circuit, and squaring unit squares the detected difference. The squared value thus obtained shows a minimum value when the phase of a clock signal output from a clock regenerating circuit coincides with a normal position of signal point. Therefore, phase adjusting unit outputs a control signal to the clock regenerating circuit while monitoring the squared value, to adjust the phase of the clock signal output from the clock regenerating circuit so that the squared value output from the squaring unit may be minimized.

6 Claims, 25 Drawing Sheets

CLOCK PHASE DETECTING CIRCUIT

BACKGROUND OF THE INVENTION (1) Field of the Invention

The present invention relates to a clock phase detecting circuit, and more particularly, to a clock phase detecting circuit provided in a receiving section of a multiplex radio apparatus.

(2) Description of the Related Art

Generally, a receiving section of a multiplex radio apparatus is provided with a clock regenerating circuit. The clock regenerating circuit, which is also called BIT (Bit Timing Recovery), usually regenerates a clock component from a signal which is obtained by demodulating a multilevel quadrature modulated signal modulated according to PSK (Phase Shift Keying), QAM (Quadrature Amplitude Modulation) or the like, and supplies, as a sampling clock signal, to a discriminator (A/D converter) which primarily serves to discriminate received data.

The clock signal regenerated by the clock regenerating circuit must be exactly in phase with the timing at which the level of the demodulated signal is to be discriminated, but in some cases, the phase of the regenerated clock signal becomes deviated due to variations in channel conditions attributable to temperature change etc.

It is therefore necessary that the clock signal regenerated by the clock regenerating circuit should be subjected to phase correction, but in order to carry out such correction, a clock phase detecting circuit capable of detecting a clock phase deviation with high accuracy is required.

FIG. 24 is a block diagram showing the arrangement of a receiving section of a conventional multiplex radio apparatus. In FIG. 24, a signal which has been subjected to multilevel quadrature modulation, such as PSK, QAM or the like, in a transmitting-side multiplex radio apparatus (not shown) is transmitted to the receiving-side multiplex radio apparatus which, on receiving the signal, performs frequency conversion on the received signal. The frequency-converted IF signal is input to a quadrature detecting section 101, which then outputs two baseband signals (Ich signal and Qch signal) having their phases shifted by 90° from each other to respective discriminating sections 102 and 103. The discriminating sections 102 and 103 each sample the corresponding signals, which have been demodulated by the quadrature detecting section 101, in accordance with a predetermined clock signal, then discriminate the sampled signals by means of a predetermined discrimination level, and convert the signals to digital signals. An equalizer 104 performs an equalization process on each of the digital signals output from the discriminating sections 102 and 103.

Based on the Ich signals input to and output from the equalizer 104, a phase component detecting section 105 detects the phase component of a clock signal (signal discrimination clock signal) for the signal discrimination at the discriminating sections 102 and 103, and outputs the detected phase component to an integrator 106. The integrator 106 averages the phase component output from the phase component detecting section 105, and outputs the result to a phase shifter 107 as a control signal for phase adjustment. Based on the phase adjustment control signal supplied from the integrator 106, the phase shifter 107 adjusts the phase of an A/D conversion clock signal generated by a clock regenerating section 108, and supplies the thus-adjusted clock signal to the discriminating sections 102 and 103. The clock regenerating section 108 regenerates the clock signal for A/D conversion based on the IF signal which is not yet subjected to the detection by the quadrature detecting section 101.

FIG. 25 is a block diagram showing the internal arrangement of the phase component detecting section 105. In FIG. 25, a gradient determining section 110 detects the gradient of the Ich signal, that is, it determines whether the Ich signal is increasing or decreasing with time. This is performed to determine in which direction phase deviation should be corrected. An error detecting section 111 comprises a subtracter and calculates the difference between the Ich signals input to and output from the equalizer 104, to thereby detect the error between the input and output signals to and from the equalizer 104. This error corresponds to the amount of phase deviation. A clock phase computing section 112, which comprises a multiplier, multiplies the output of the gradient determining section 110 by the output of the error detecting section 111 and outputs phase deviation information (phase component) for the A/D conversion clock signal. A signal determining section 113 determines whether or not the phase deviation information (phase component) output from the clock phase computing section 112 is reliable information. Specifically, only when the Ich signal is monotonously and steeply increasing or is monotonously and steeply decreasing, it is judged that the phase deviation information (phase component) output from the clock phase computing section 112 is reliable information; otherwise it is not desirable that the phase deviation information (phase component) output from the clock phase computing section 112 be used for the adjustment of the phase of the A/D conversion clock signal generated by the clock regenerating section 108. Accordingly, the signal determining section 113 determines whether or not the signal point of the Ich signal input to the gradient determining section 110 and the error detecting section 111 falls within a specific region (a range of predetermined level difference from the normal position of the signal point) on a so-called eye pattern, and if the signal point falls within the specific region, the signal determining section 113 judges that the phase deviation information (phase component) output from the clock phase computing section 112 is unreliable information. A selecting section 114, which comprises a flip-flop, outputs the phase deviation information (phase component) for the A/D conversion clock signal only when the signal determining section 113 judges that the signal point of the Ich signal input to the gradient determining section 110 and the error detecting section 111 does not exist in the specific region on the eye pattern; otherwise it outputs the previous phase deviation information.

In cases where deep phasing is occurring in the transmission channel between the transmitting section and the receiving section of multiplex radio apparatuses, there is generally observed a decrease of the high-frequency component in the frequency spectrum of the baseband signals input to the equalizer 104 of the receiving section of the conventional multiplex radio apparatus. Therefore, the signal point shows a moderate level change, so that the shape of the eye pattern near the signal point of the Ich signal becomes relatively flat. As a result, the probability that the signal point of the Ich signal is judged to be within the specific region on the eye pattern by the signal determining section 113 of the phase component detecting section 105 increases, which in turn lessens the frequency with which the selecting section 114 outputs reliable phase deviation information (phase component).

Thus, when deep phasing is occurring, a problem arises in that the phase of the A/D conversion clock signal supplied to the discriminating sections 102 and 103 cannot be quickly corrected with stability. This problem is noticeable especially in the case where a decision feedback equalizer (DFE) is employed as the equalizer 104.

SUMMARY OF THE INVENTION

An object of the present invention is to provide a clock phase detecting circuit capable of quick and stable correction of the phase of the A/D conversion clock signal supplied to the discriminating sections even during the occurrence of deep phasing.

To achieve the above object, there is provided a clock phase detecting circuit arranged in a receiving section of a multiplex radio apparatus which includes a clock regenerating circuit for regenerating a clock signal, an A/D converting circuit for converting a multilevel quadrature demodulated signal to a digital value in accordance with timing of the clock signal supplied from the clock regenerating circuit, and an equalizing circuit for performing an equalization process on the digital value output from the A/D converting circuit. The clock phase detecting circuit comprises difference detecting means for detecting the difference between input and output signals to and from the equalizing circuit, squaring means for squaring the difference detected by the difference detecting means, and phase adjusting means for adjusting the phase of the clock signal output from the clock regenerating circuit in such a manner that the output value from the squaring means is minimized.

To achieve the above object, there is also provided a clock phase detecting circuit arranged in a receiving section of a multiplex radio apparatus which includes a clock regenerating circuit for regenerating a clock signal, an A/D converting circuit for converting a multilevel quadrature demodulated signal to a digital value in accordance with timing of the clock signal supplied from the clock regenerating circuit, and an equalizing circuit for performing an equalization process on the digital value output from the A/D converting circuit. This clock phase detecting circuit comprises summing means for obtaining two predetermined tap coefficients from the equalizing circuit, and summing up the absolute values of the tap coefficients, and phase adjusting means for adjusting the phase of the clock signal output from the clock regenerating circuit in such a manner that the sum obtained by the summing means is minimized.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
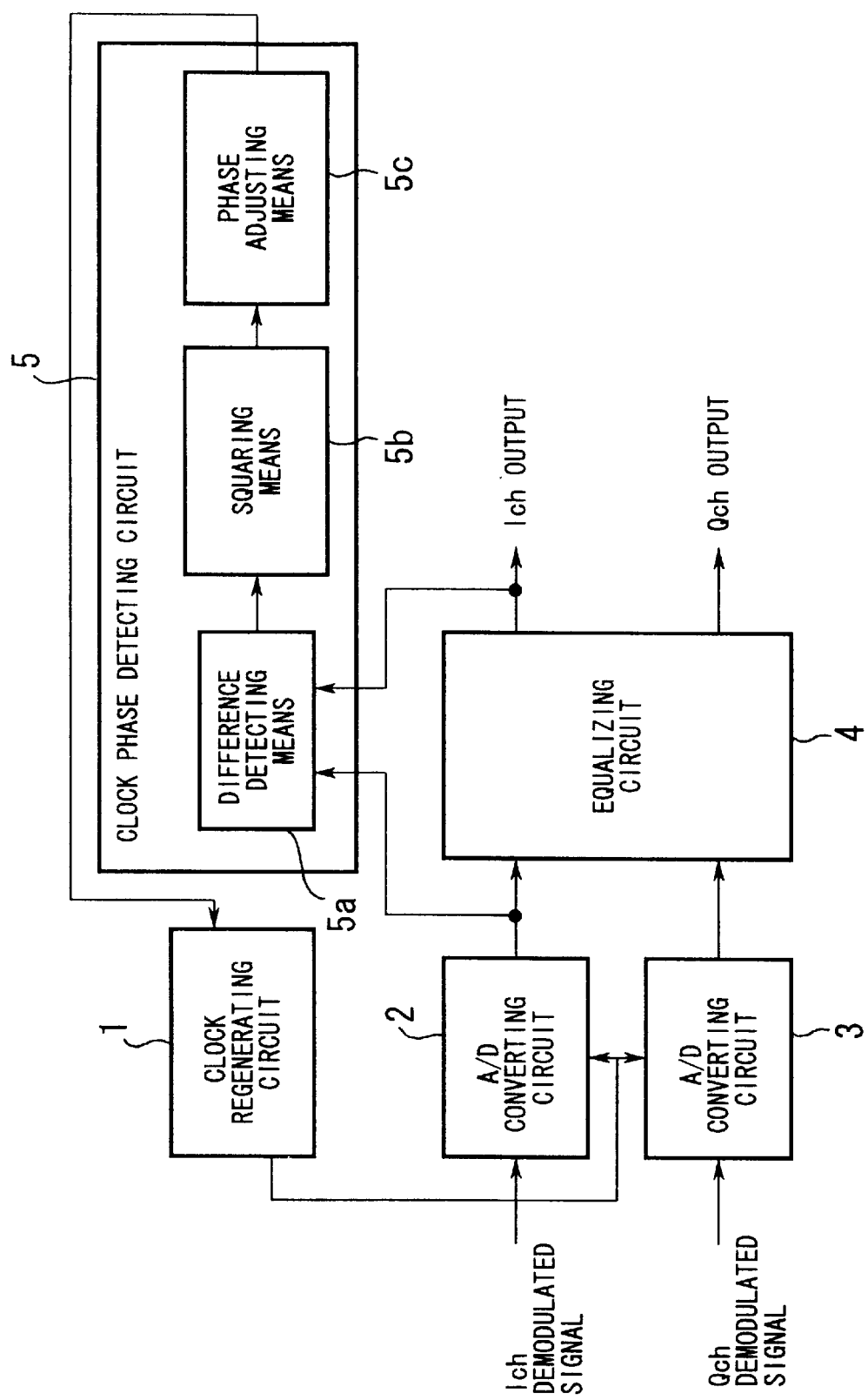
FIG. 1 is a diagram illustrating a first principle of the present invention.

Embodiments according to the present invention will be hereinafter described with reference to the drawings.

First, a theoretical arrangement according to a first embodiment will be explained with reference to FIG. 1. The first embodiment comprises difference detecting means 5a for detecting the difference between input and output signals to and from an equalizing circuit 4, squaring means 5b for squaring the difference detected by the difference detecting means 5a, and phase adjusting means 5c for adjusting the phase of a clock signal output from a clock regenerating circuit 1 in such a manner that the output value of the squaring means 5b is minimized.

With this arrangement, the difference detecting means 5a detects the difference between the input and output signals to and from the equalizing circuit 4, and this difference is squared by the squaring means 5b. The squared value thus obtained takes a minimum value when the phase of the clock signal output from the clock regenerating circuit 1 coincides with the normal position of the signal point. Accordingly, the phase adjusting means 5c outputs a control signal to the clock regenerating circuit 1 while monitoring the squared value, to adjust the phase of the clock signal output from the clock regenerating circuit 1 so that the squared value output from the squaring means 5b may be minimized.

Thus, according to the invention shown in FIG. 1, the clock regenerating circuit 1 is controlled by using the entirety of the difference detected by the difference detecting means 5a; therefore, even when deep phasing is occurring, it is possible to promptly and stably correct the phase of an A/D conversion clock signal supplied to A/D converting circuits 2 and 3.

Absolutizing means for absolutizing the difference detected by the difference detecting means 5a may be used in place of the squaring means 5b, and also in this case similar operation and advantage can be achieved.

Figure 3:
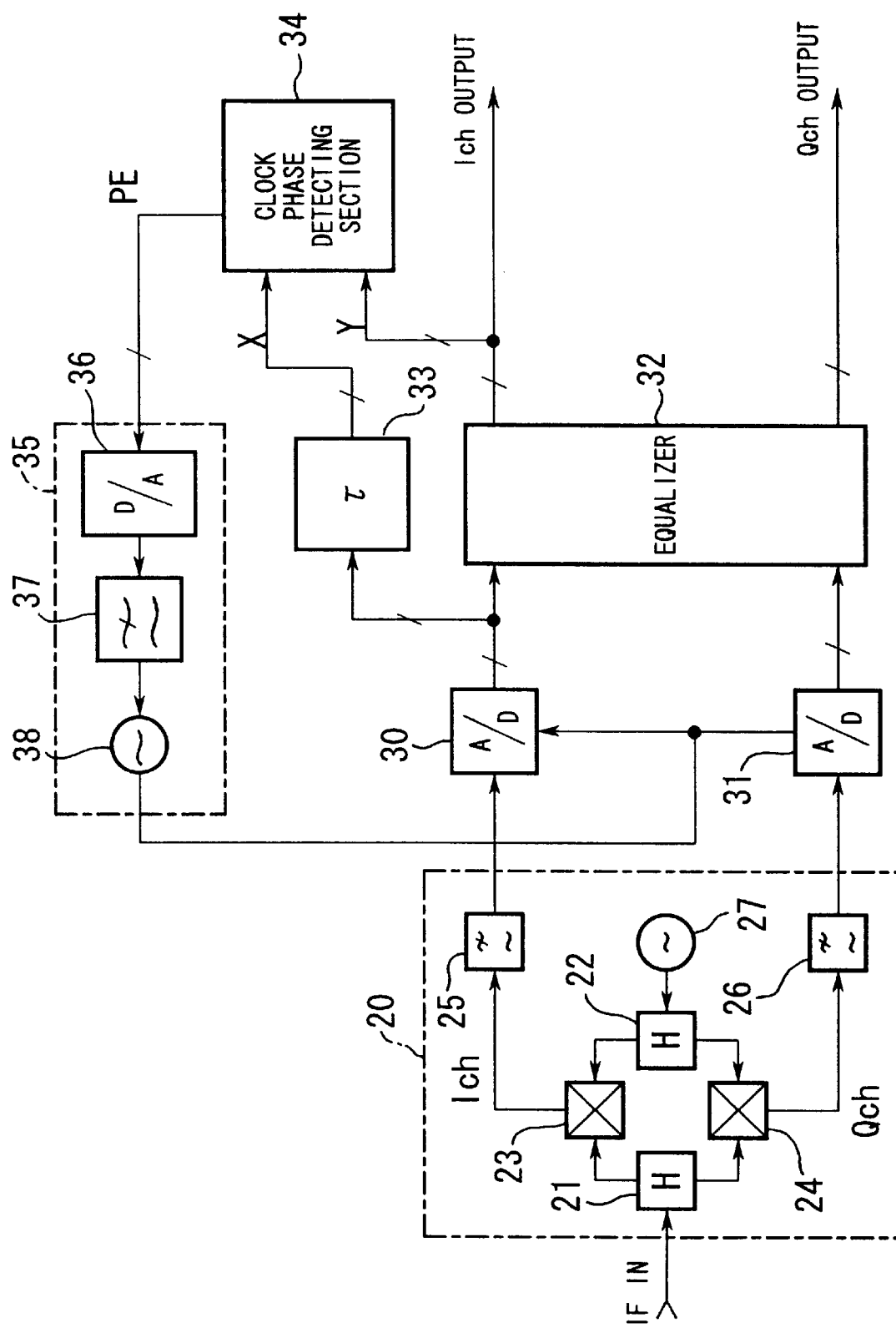
FIG. 3 is a block diagram showing the arrangement of a receiving section of a multiplex radio apparatus according to a first embodiment.

FIG. 3 is a block diagram showing the arrangement of a receiving section of a multiplex radio apparatus according to the first embodiment. Correspondence of the individual elements shown in FIG. 1 to those shown in FIG. 3 will be explained later.

In FIG. 3, a signal which has been subjected to multilevel quadrature modulation, such as PSK, QAM or the like, in a transmitting-side multiplex radio apparatus (not shown) is transmitted to the receiving-side multiplex radio apparatus which, or receiving the signal, performs frequency conversion on the received signal. The frequency-converted IF signal is input to a quadrature detecting section 20, which then outputs two baseband signals (Ich signal and Qch signal) having their phases shifted by 90° from each other to respective A/D converters 30 and 31. The A/D converters 30 and 31 each sample the corresponding signals, which have been demodulated by the quadrature detecting section 20, in accordance with a predetermined clock signal, quantize and then convert the sampled signals to digital signals. An equalizer 32 comprises a transversal equalizer which is an adaptive digital filter, a decision feedback equalizer or the like, and performs an equalization process on each of the digital signals output from the A/D converters 30 and 31.

Based on the Ich signals input to and output from the equalizer 32, a clock phase detecting section 34 detects a clock phase error signal PE and outputs the same to a clock regenerating circuit 35. The Ich input signal for the equalizer 32 is delayed by a delay circuit 33 for timing adjustment so that it may be identical with the Ich signal output from the equalizer 32. Although not shown in detail, the clock regenerating circuit 35 generates a predetermined clock signal identical with the transmitting-side clock signal and supplies the same to the A/D converters 30 and 31. Based on the clock phase error signal PE supplied from the clock phase detecting section 34, the clock regenerating circuit 35 adjusts the phase of the predetermined clock signal so that the A/D converters 30 and 31 can perform sampling with proper timing.

The quadrature detecting section 20 comprises hybrids 21 and 22, phase detectors 23 and 24, roll-off filters 25 and 26, and a local oscillator 27. The input IF signal is split by the hybrid 21 into two, which are then output to the phase detectors 23 and 24, respectively. A carrier regenerated signal in phase with the carrier wave is output from the local oscillator 27 and is split by the hybrid 22 into two waves having their phases shifted by 90° from each other, and these two waves are output to the phase detectors 23 and 24, respectively.

Consequently, two baseband signals (Ich signal and Qch signal) having their phases shifted by 90° from each other are obtained at the respective phase detectors 23 and 24. The Ich and Qch signals are passed through the roll-off filters 25 and 26 and subjected to A/D conversion by the A/D converters 30 and 31, respectively, thereby obtaining digital demodulated signals having phases thereof shifted by 90° from each other.

The clock regenerating circuit 35 comprises a D/A converter 36, a lag-lead filter 37, and a clock oscillator (VCXO) 38. The D/A converter 36 converts the clock phase error signal PE, supplied thereto from the clock phase detecting section 34, to an analog signal, and the lag-lead filter 37 averages this analog signal. The clock oscillator 38 generates a clock signal, adjusts the phase thereof in accordance with the output voltage value of the lag-lead filter 37, and outputs the adjusted clock signal to the A/D converters 30 and 31.

Figure 4:
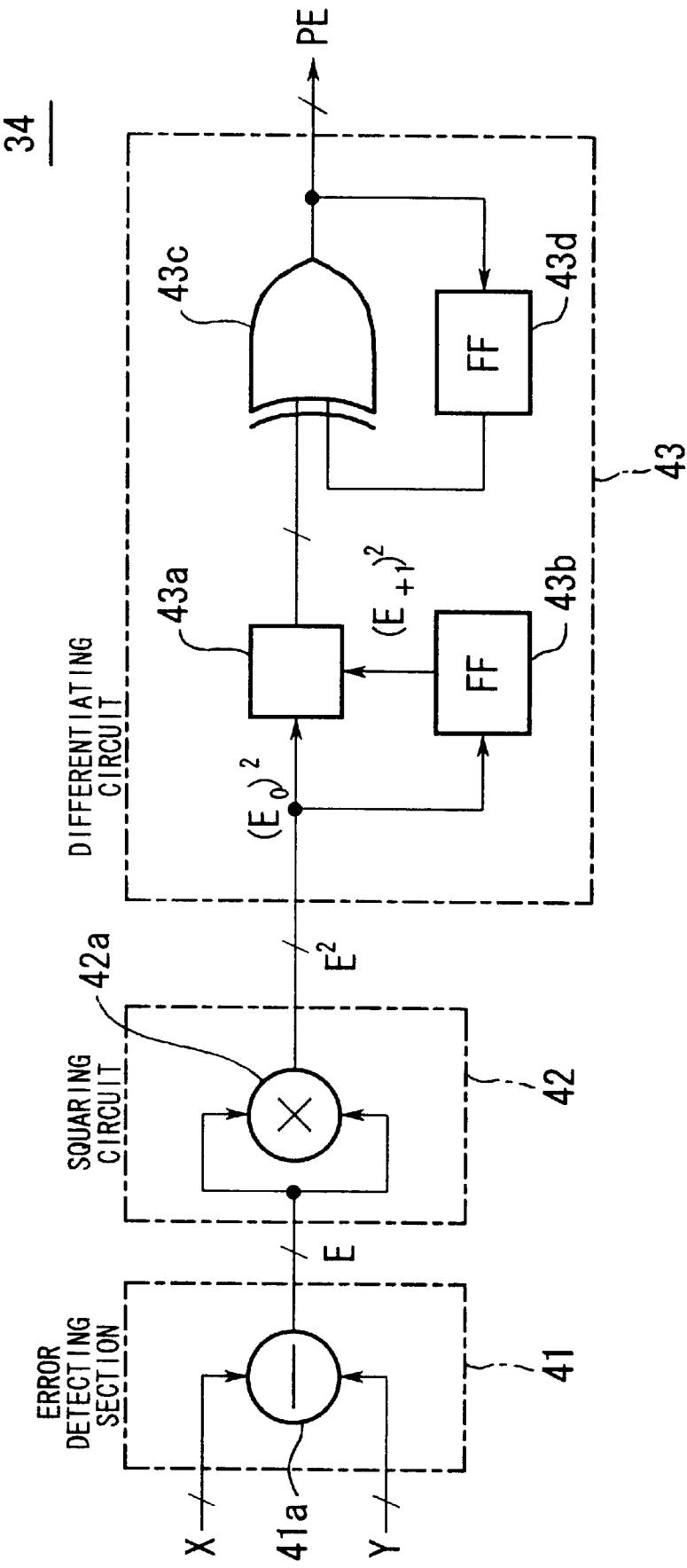
FIG. 4 is a block diagram showing the internal arrangement of a clock phase detecting section according to the first embodiment.

FIG. 4 is a block diagram showing the internal arrangement of the clock phase detecting section 34. The clock phase detecting section 34 comprises an error detecting section 41, a squaring circuit 42 and a differentiating circuit 43, and each of these elements performs multibit digital signal processing. The error detecting section 41, which includes a subtracter 41a, calculates the difference between the Ich signals input to and output from the equalizer 32 and outputs the result to the squaring circuit 42 as an error signal E. The squaring circuit 42, which includes a multiplier, multiplies the error signal E by itself to obtain a value $E^2$.

Figure 5:
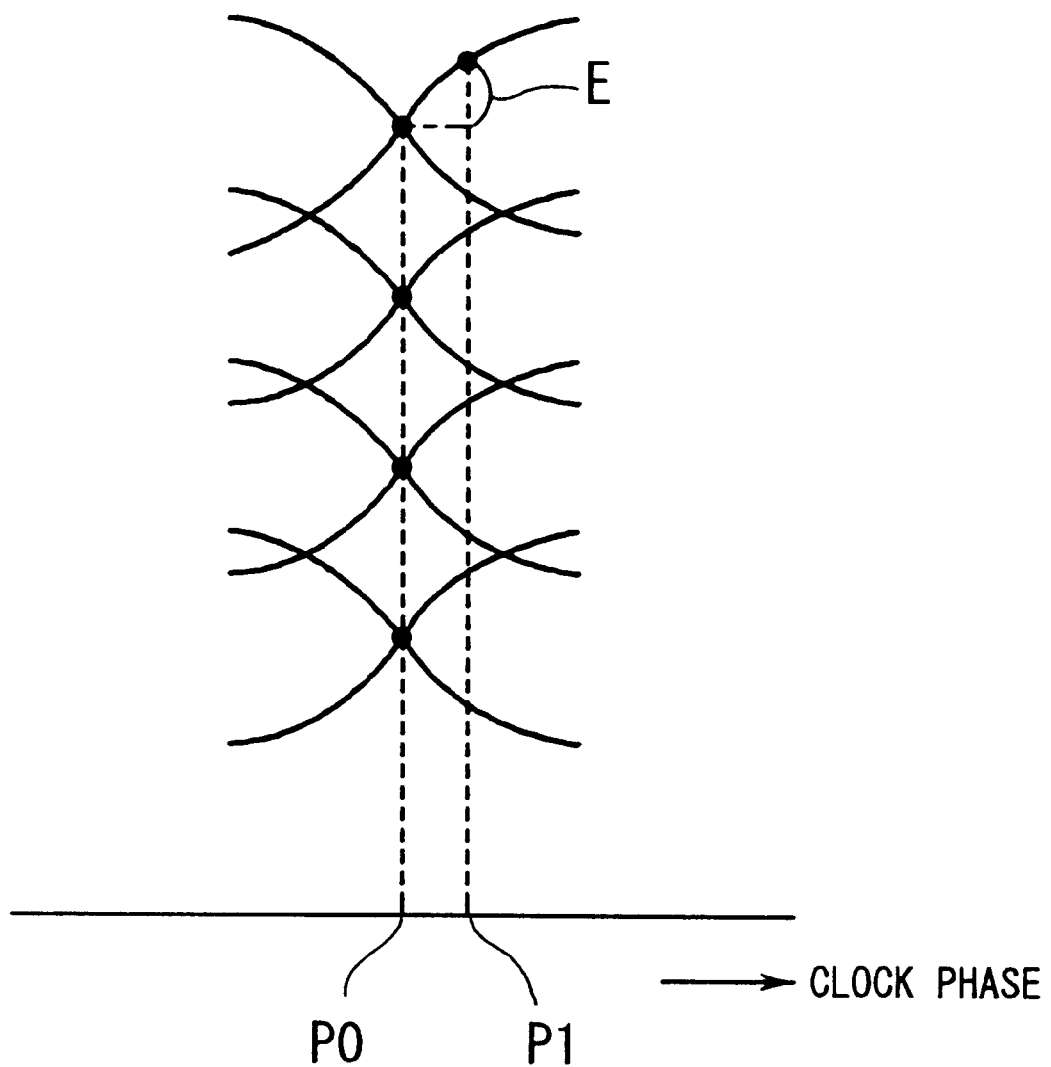
FIG. 5 is a diagram showing an eye pattern for an Ich signal on the assumption that the multiplex radio apparatus of the first embodiment employs a 16-level QAM technique.
Figure 6:
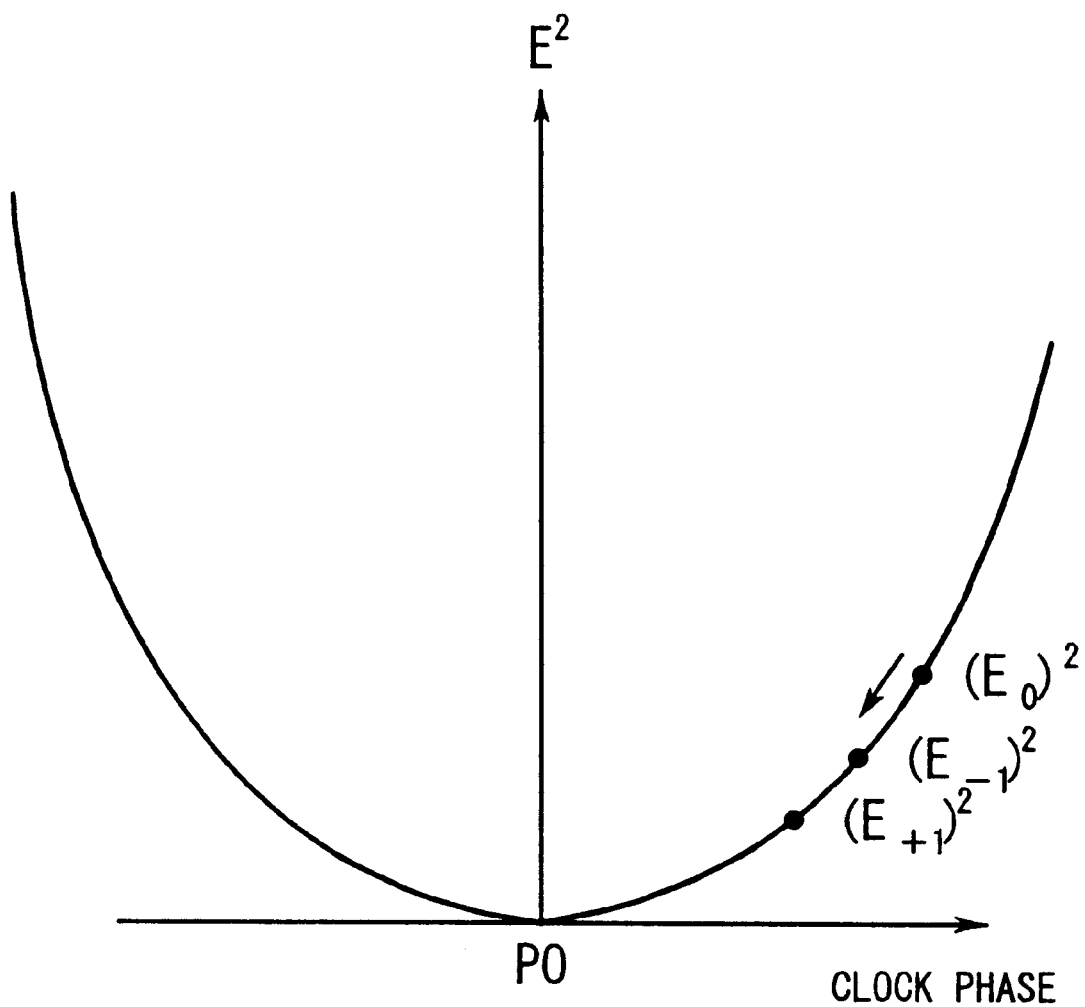
FIG. 6 is a graph showing the squared value $E^2$ of an error signal E.

FIG. 5 shows an eye pattern for the Ich signal on the assumption that the multiplex radio apparatus according to the first embodiment employs a 16-level QAM technique. In FIG. 5, if the clock phase is deviated to P1 in the case where the normal signal point can be detected at clock phase P0, the error signal E detected by the error detecting section 41 takes a value as shown in FIG. 5. Since the error signal E can be both positive and negative, the signal E is squared. FIG. 6 is a graph showing the squared value $E^2$ of the error signal E. As seen from FIG. 6, the squared value $E^2$ can be expressed as a quadratic function of the clock phase, and decreases as the clock phase approaches the clock phase P0. From this it follows that the phase of the clock signal generated by the clock regenerating circuit 35 should preferably be controlled so that the squared value $E^2$ may be minimized.

To this end, the differentiating circuit 43 comprises a comparator 43a, a flip-flop 43b for providing a one-clock delay, an exclusive-OR circuit (EX-OR) 43c, and a flip-flop 43d for providing a one-clock delay. The comparator 43a compares present and previous squared values $E^2$ with each other, that is, it compares a present value $(E_0)^2$ with a previous value $(E_{+1})^2$. If the present value $(E_0)^2$ is greater than the previous value $(E_{+1})^2$, the comparator 43a outputs the value "1" to the exclusive-OR circuit 43c, and if the present value $(E_0)^2$ is smaller than the previous value $(E_{+1})^2$, the comparator 43a outputs the value "0" to the exclusive- OR circuit 43c. When the output value from the comparator 43a is "1", the exclusive-OR circuit 43c inverts the previous value of the clock phase error signal PE, which is the output therefrom, and outputs the inverted value as the present value of the clock phase error signal PE; on the other hand, when the output value from the comparator 43a is "0", the exclusive-OR circuit 43c outputs the previous value of the clock phase error signal PE directly as the present value.

On receiving the clock phase error signal PE, the clock regenerating circuit 35 shifts the clock phase in the positive direction (rightward in FIG. 6) if the clock phase error signal PE indicates the value "1", and shifts the clock phase in the negative direction (leftward in FIG. 6) if the clock phase error signal PE indicates the value "0".

For example, let it be assumed that, in FIG. 6, $(E_{+1})^2$ and $(E_0)^2$ were detected as the previous and present values, respectively. The present value $(E_0)^2$ is greater than the previous value $(E_{+1})^2$, and therefore, the comparator 43a outputs the value "1". Here, if the previous value output from the exclusive-OR circuit 43c as the clock phase error signal PE was "1", the present value output from the exclusive-OR circuit 43c as the clock phase error signal PE is "0". Consequently, the clock phase is shifted in the negative direction (leftward), providing $(E_{-1})^2$ as the next value. Since the next value $(E_{-1})^2$ is smaller than the present value $(E_0)^2$, the comparator 43a outputs the value "0". Accordingly, the exclusive-OR circuit 43c outputs the value "0" as the next value of the clock phase error signal PE. As a result, the clock phase is again shifted in the negative direction (leftward). This clock phase shift is repeated until the squared value $E^2$ reaches a minimum point (corresponding to the clock phase P0), and when the minimum point is exceeded, the output value of the comparator 43a becomes "1" and thus the value of the clock phase error signal PE is inverted from "0" to "1", so that the clock phase is shifted in the positive direction (rightward). In this manner, the squared value $E^2$ converges to the minimum point (corresponding to the clock phase P0).

In the case where $(E_{+1})^2$ and $(E_0)^2$ shown in FIG. 6 were detected as the previous and present values, respectively, and thus the comparator 43a output the value "1", as mentioned above, if the previous value output from the exclusive-OR circuit 43c as the clock phase error signal PE was "0", the present value output from the exclusive-OR circuit 43c as the clock phase error signal PE is "1". Therefore, in this case, the clock phase is shifted in the positive direction (rightward). However, the comparator 43a outputs the value "1" next time, and since the present value of the clock phase error signal PE output from the exclusive-OR circuit 43c is "1", the exclusive-OR circuit 43c outputs the value "0" next time as the clock phase error signal PE. Consequently, the clock phase shifts in the negative direction (leftward). The clock phase is thereafter shifted in the same manner as described above.

As stated above, the entirety of the error signal E detected each time by the error detecting section 41 is used as the clock phase error signal PE, regardless of the occurrence or degree of phasing. Accordingly, even when deep phasing is occurring, the phase of the clock signal for the A/D conversion can be quickly and stably corrected.

The clock regenerating circuit 1 shown in FIG. 1 corresponds to the clock regenerating circuit 35 shown in FIG. 3, the A/D converting circuits 2 and 3 in FIG. 1 correspond to the A/D converters 30 and 31 in FIG. 3, the equalizing circuit 4 in FIG. 1 corresponds to the equalizer 32 in FIG. 3, the clock phase detecting circuit 5 in FIG. 1 corresponds to the clock phase detecting section 34 in FIG. 3, the difference detecting means 5a in FIG. 1 corresponds to the error detecting section 41 shown in FIG. 4, the squaring means 5b in FIG. 1 corresponds to the squaring circuit 42 in FIG. 4, and the phase adjusting means 5c in FIG. 1 corresponds to the differentiating circuit 43 in FIG. 4.

A second embodiment will be now described.

The second embodiment is basically identical in arrangement with the first embodiment, but the arrangement of the clock phase detecting section 34 partly differs from that of the first embodiment. Also, the differentiating circuit 43 and the clock regenerating circuit 35 each have a multibit structure. In the following description of the second embodiment, identical reference numerals are used to denote identical elements; therefore, for such elements, reference should be made to the description of the first embodiment and description thereof is omitted.

Figure 7:
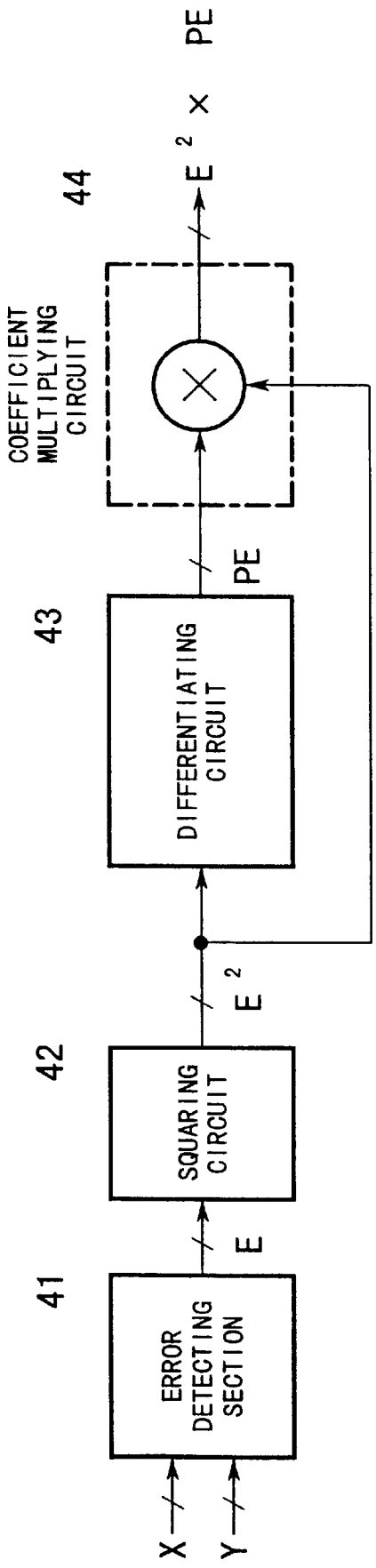
FIG. 7 is a block diagram showing the internal arrangement of a clock phase detecting section according to a second embodiment.

FIG. 7 is a block diagram showing the internal arrangement of the clock phase detecting section 34 according to the second embodiment. In the second embodiment, a coefficient multiplying circuit 44 is additionally provided. The coefficient multiplying circuit 44, which comprises a multiplier, multiplies the output value $E^2$ of the squaring circuit 42 by the clock phase error signal PE which is the output of the differentiating circuit 43, and outputs the obtained value ($E^2 \times PE$) to the clock regenerating circuit 35.

The differentiating circuit 43 obtains an instantaneous gradient (differential) of the present output value $E^2$ on the curve (FIG. 6) plotted along the output values $E^2$ of the squaring circuit 42, and outputs a multibit value, which is obtained by inverting the value of the instantaneous gradient, as the clock phase error signal PE. Based on the multibit value ($E^2 \times PE$) supplied from the coefficient multiplying circuit 44, the clock regenerating circuit 35 shifts the clock phase. Specifically, if the clock phase error signal PE indicates a positive value, the clock regenerating circuit 35 shifts the clock phase in the positive direction (rightward) in FIG. 6 in such a manner that the amount by which the clock phase is shifted increases with increase in the absolute value of the error signal; on the other hand, if the clock phase error signal PE indicates a negative value, the clock regenerating circuit 35 shifts the clock phase in the negative direction (leftward) in FIG. 6 in such a manner that the amount by which the clock phase is shifted increases with increase in the absolute value of the error signal.

Namely, the use of the coefficient multiplying circuit 44 makes it possible to set a larger correction amount for the clock phase as the squared value $E^2$ increases, whereby the clock phase can converge more quickly than in the first embodiment.

A third embodiment will be now described.

The third embodiment is basically identical in arrangement with the first embodiment, but the arrangement of the clock phase detecting section 34 partly differs from that of the first embodiment. In the following description of the third embodiment, identical reference numerals are used to denote identical elements; therefore, for such elements, reference should be made to the description of the first embodiment and description thereof is omitted.

Figure 8:
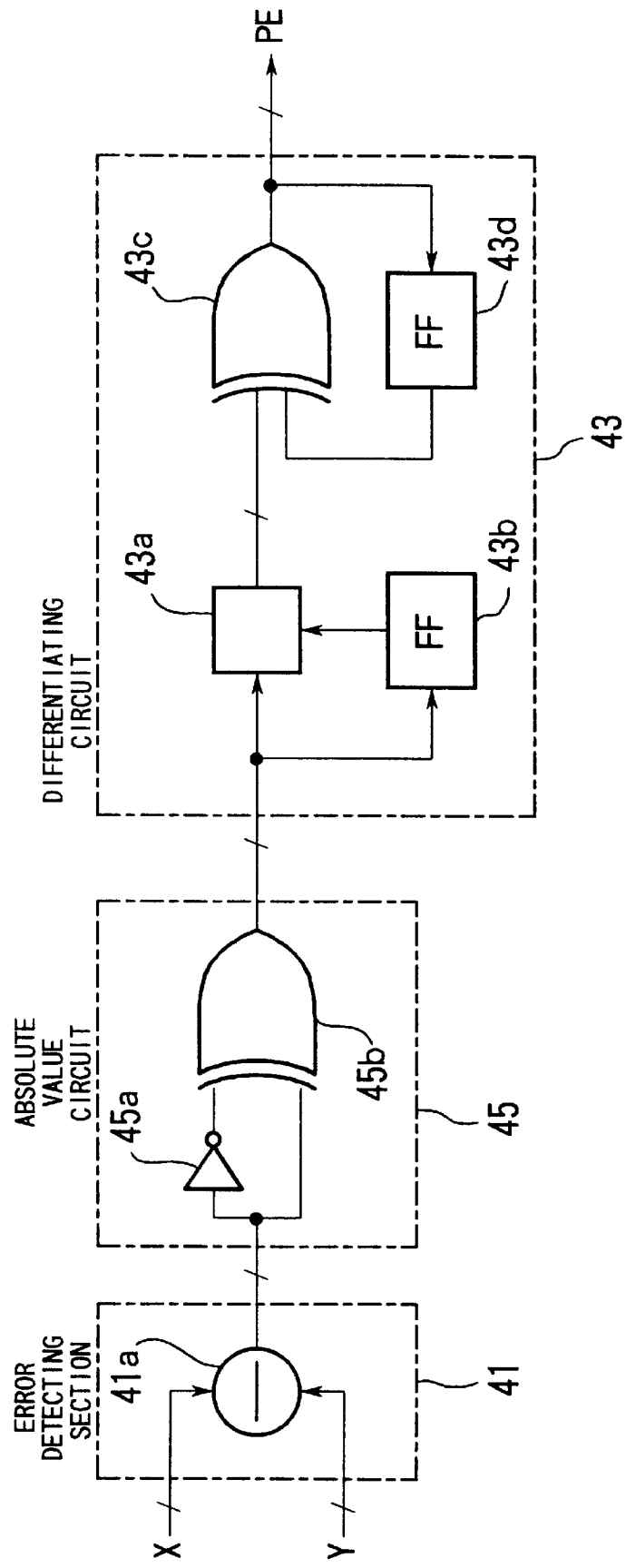
FIG. 8 is a block diagram showing the internal arrangement of a clock phase detecting section according to a third embodiment.

FIG. 8 is a block diagram showing the internal arrangement of the clock phase detecting section 34 according to the third embodiment. In the third embodiment, an absolute value circuit 45 is used in place of the squaring circuit 42 in the first embodiment. The absolute value circuit 45 comprises an inverter 45a and an exclusive-OR circuit 45b.

Figure 9:
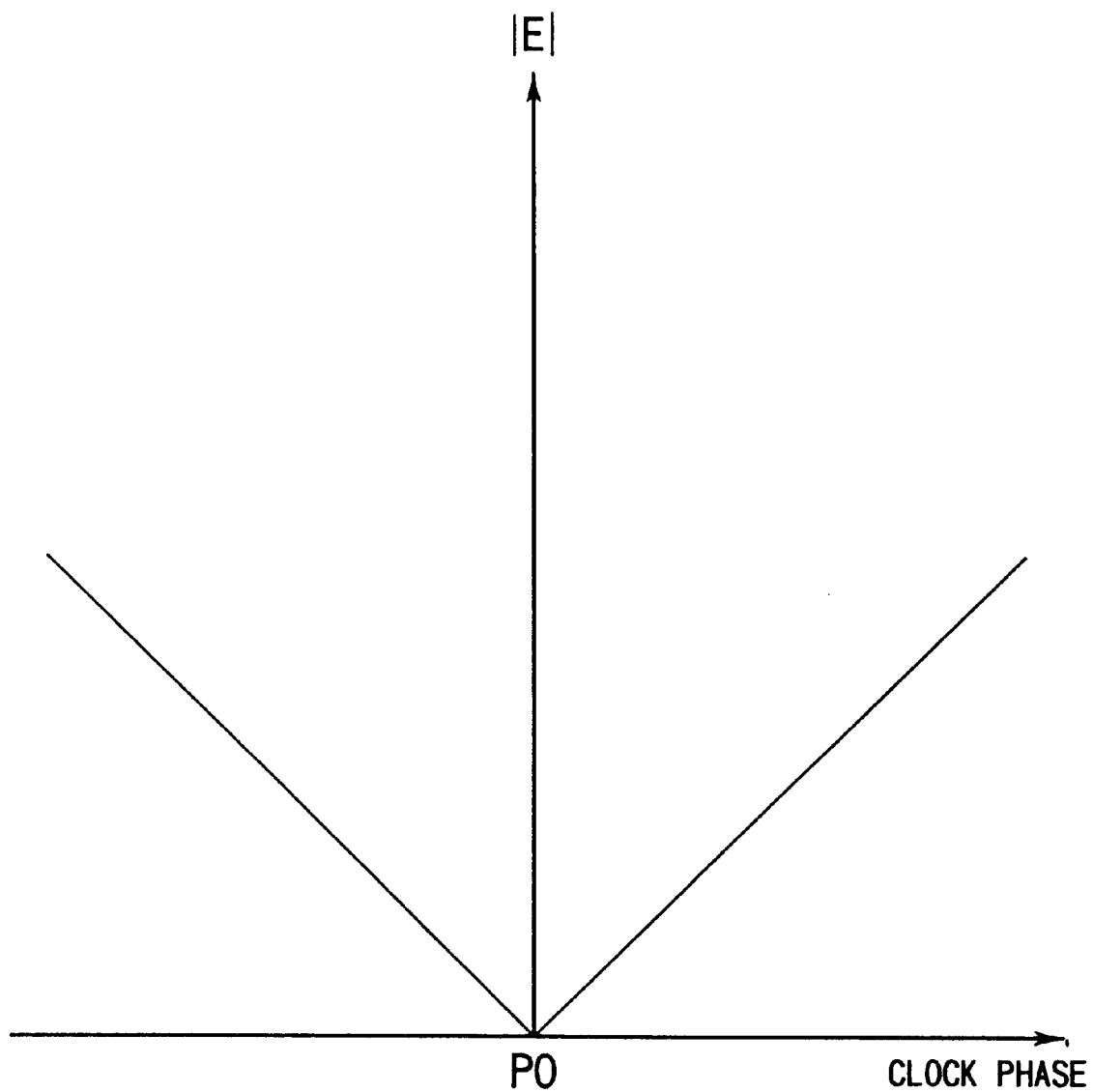
FIG. 9 is a graph showing an output value $|E|$ of an absolute value circuit in relation to clock phase.

FIG. 9 is a graph showing the output value |E| of the absolute value circuit 45 in relation to the clock phase. As seen from FIG. 9, the output value |E| decreases as the clock phase approaches the clock phase P0, like the squared value $E^2$ shown in FIG. 6. From this it follows that the phase of the clock signal generated by the clock regenerating circuit 35 should desirably be controlled so that the output value |E| may be minimized.

To this end, also in the third embodiment, the differentiating circuit 43 determines the clock phase error signal PE in the same manner as in the first embodiment.

A fourth embodiment will be now described.

The fourth embodiment is a combination of the second embodiment shown in FIG. 7 and the third embodiment shown in FIG. 8.

Figure 10:
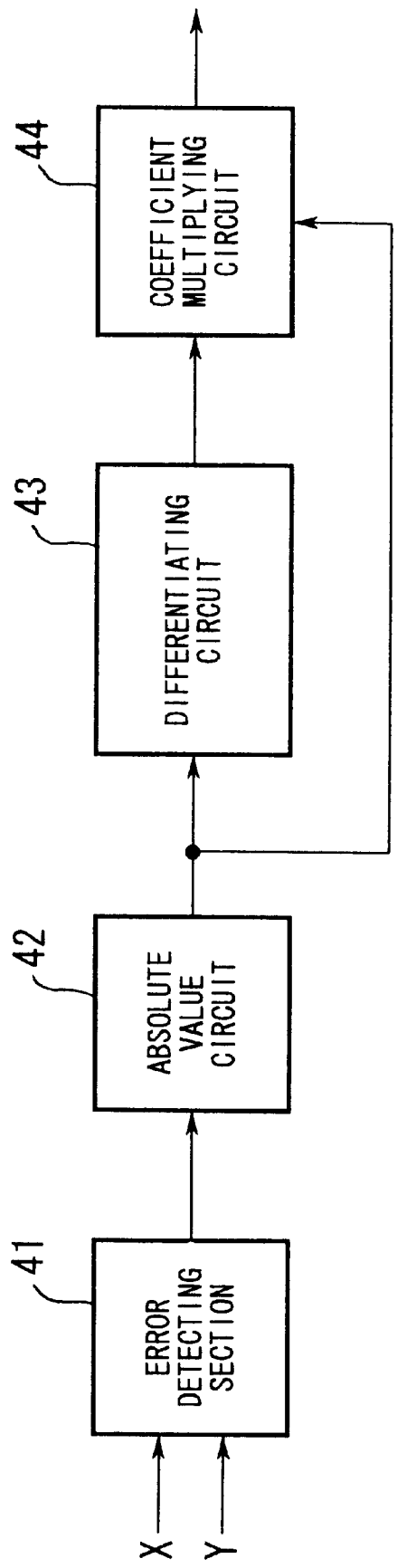
FIG. 10 is a block diagram showing the internal arrangement of a clock phase detecting section according to a fourth embodiment.

FIG. 10 is a block diagram showing the internal arrangement of the clock phase detecting section 34 according to the fourth embodiment. Specifically, in the fourth embodiment, the squaring circuit 42 in the second embodiment is replaced by the absolute value circuit 45 used in the third embodiment. The clock phase detecting section with this arrangement operates in the same manner as in the second embodiment.

A fifth embodiment will be now described.

The fifth embodiment is basically identical in arrangement with the first embodiment; therefore, identical reference numerals are used to denote identical elements and description of such elements is omitted.

Figure 11:
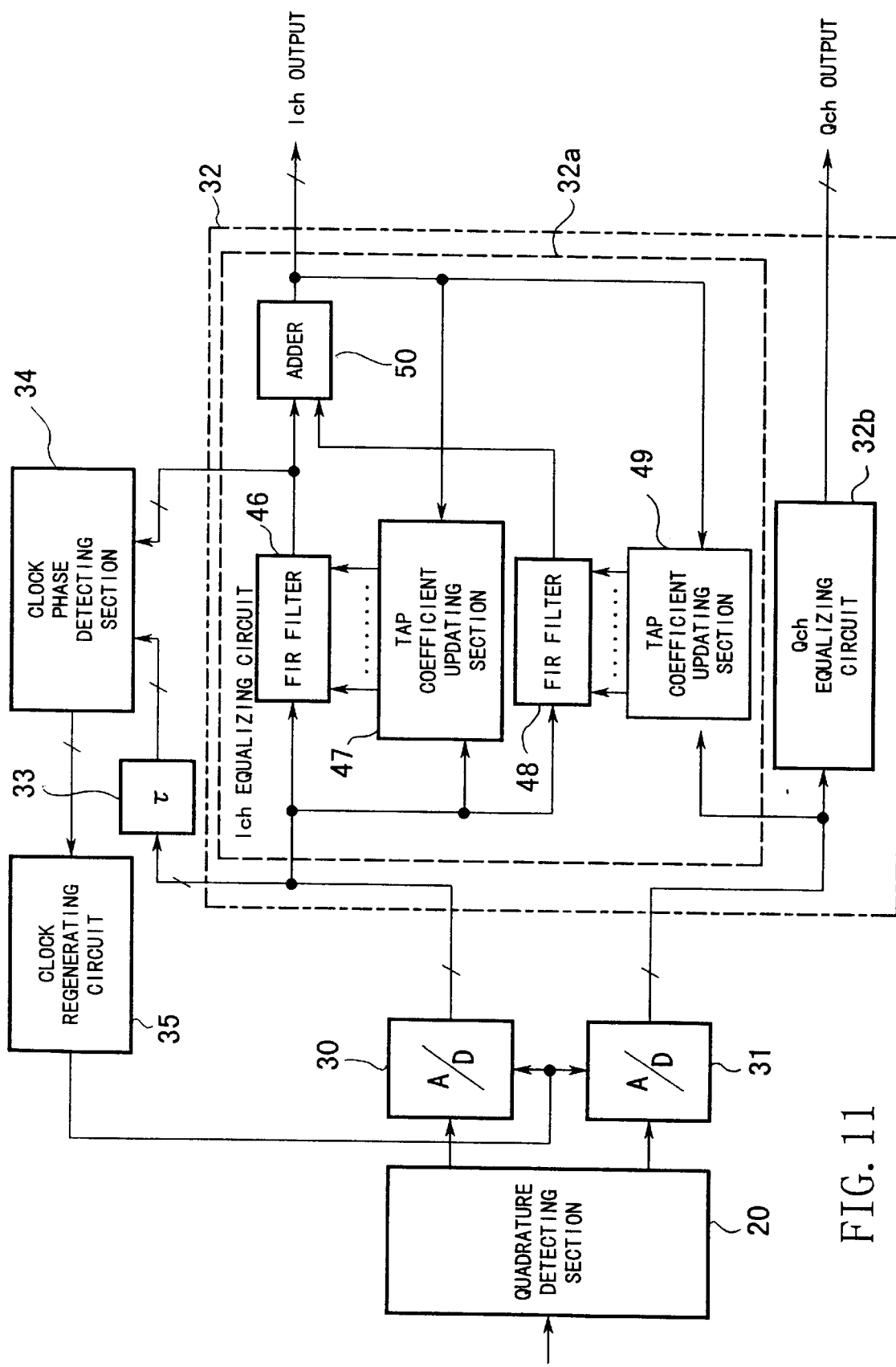
FIG. 11 is a block diagram showing the arrangement of a receiving section of a multiplex radio apparatus according to a fifth embodiment.

FIG. 11 is a block diagram showing the arrangement of a receiving section of a multiplex radio apparatus according to the fifth embodiment. As shown in FIG. 11, the equalizer 32 comprises an Ich equalizing circuit 32a and a Qch equalizing circuit 32b, and the Ich equalizing circuit 32a includes an FIR filter 46 and a tap coefficient updating section 47. The tap coefficient updating section 47 receives a polarity signal from the Ich signal and an error signal from the output of an adder 50, described later, and based on these signals, it determines a tap coefficient and sets the same in the FIR filter 46. Using the thus-set tap coefficient, the FIR filter 46 performs an equalization process on the Ich signal. In order to cancel the interference component from the Qch side, an FIR filter 48 and a tap coefficient updating section 49 are also provided. The tap coefficient updating section 49 receives a polarity signal from the Qch signal and the error signal from the output of the adder 50, determines a tap coefficient based on the received signals, and sets the coefficient in the FIR filter 48. Using the set tap coefficient, the FIR filter 48 performs an equalization process on the Ich signal. The adder 50 adds up the results of equalizations performed by the FIR filters 46 and 48, and outputs the result as the Ich signal. The output of the adder 50 corresponds to data obtained by canceling the Qch-side interference component from the Ich signal.

In the fifth embodiment, the clock phase detecting section 34 is supplied via the delay circuit 33 with the Ich signal input to the equalizer 32, as in the first embodiment, and is also supplied with the output of the FIR filter 46. The clock phase detecting section 34 operates in the same manner as that of the first embodiment.

When phasing is occurring, the Qch-side interference component shows a large value. The degree of clock phase deviation, on the other hand, should originally be detected by monitoring the signals immediately input to and output from the FIR filter, and not by monitoring the signal from which the quadrature interference component has been removed. Namely, it is not desirable that the clock phase error be detected based on the difference between the output of the adder 50, from which the Qch-side interference component has been canceled, and the Ich signal input to the equalizer 32. Therefore, in the fifth embodiment, the clock phase error is detected based on the difference between the output of the FIR filter 46 from which the Qch-side interference component is not yet canceled and the Ich signal input to the equalizer 32. Consequently, a true clock phase error can be detected when phasing is occurring.

The clock phase detecting section 34 of the fifth embodiment may be identical with any one of the clock phase detecting sections of the second to fourth embodiments.

A sixth embodiment will be now described.

First, a theoretical arrangement according to the sixth embodiment will be explained with reference to FIG. 2. The sixth embodiment comprises summing means 15a for obtaining two predetermined tap coefficients from an equalizing circuit 14 and summing up the absolute values of these tap coefficients, and phase adjusting means 15b for adjusting the phase of the clock signal output from a clock regenerating circuit 11 so that the sum obtained by the summing means 15a may be minimized.

With this arrangement, the summing means 15a obtains the two predetermined tap coefficients from the equalizing circuit 14, and sums up the absolute values of these tap coefficients. The sum thus obtained shows a minimum value when the phase of the clock signal output from the clock regenerating circuit 11 coincides with the normal position of the signal point; therefore, the phase adjusting means 15b outputs a control signal to the clock regenerating circuit 11 to adjust the phase of the clock signal output therefrom so that the sum output from the summing means 15a may be minimized.

Figure 2:
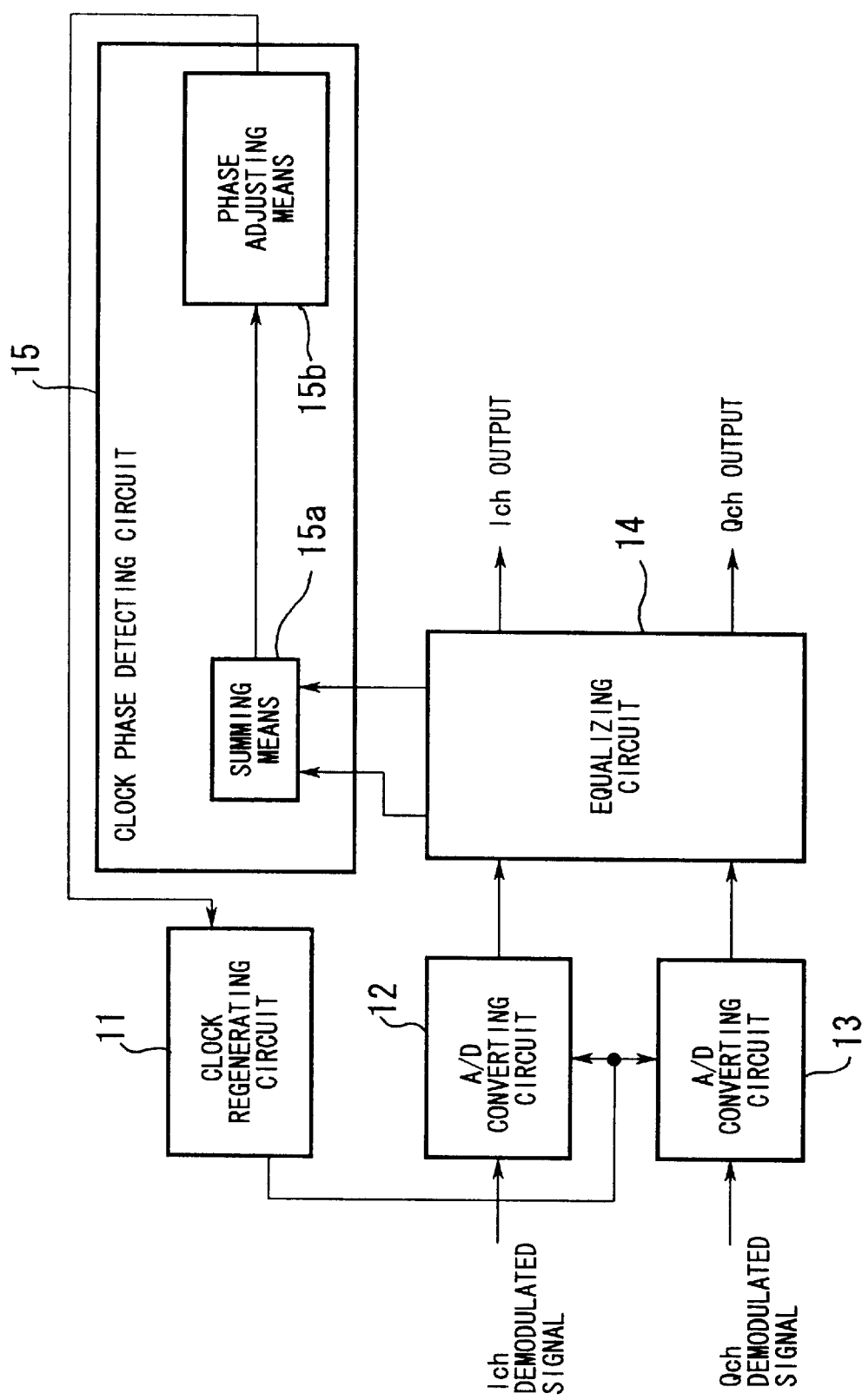
FIG. 2 is a diagram illustrating a second principle of the present invention.

Thus, according to the invention shown in FIG. 2, the sum of the absolute values of the two predetermined tap coefficients from the equalizing circuit 14, or more specifically, the entirety of the sum of the absolute values, is used for controlling the clock regenerating circuit 11, whereby even when deep phasing is occurring, the phase of the A/D conversion clock signal supplied to A/D converting circuits 12 and 13 can be quickly and stably corrected.

The detailed arrangement of the sixth embodiment is basically identical with that of the first embodiment shown in FIG. 3; therefore, identical reference numerals are used to denote identical elements and description of such elements is omitted.

Figure 12:
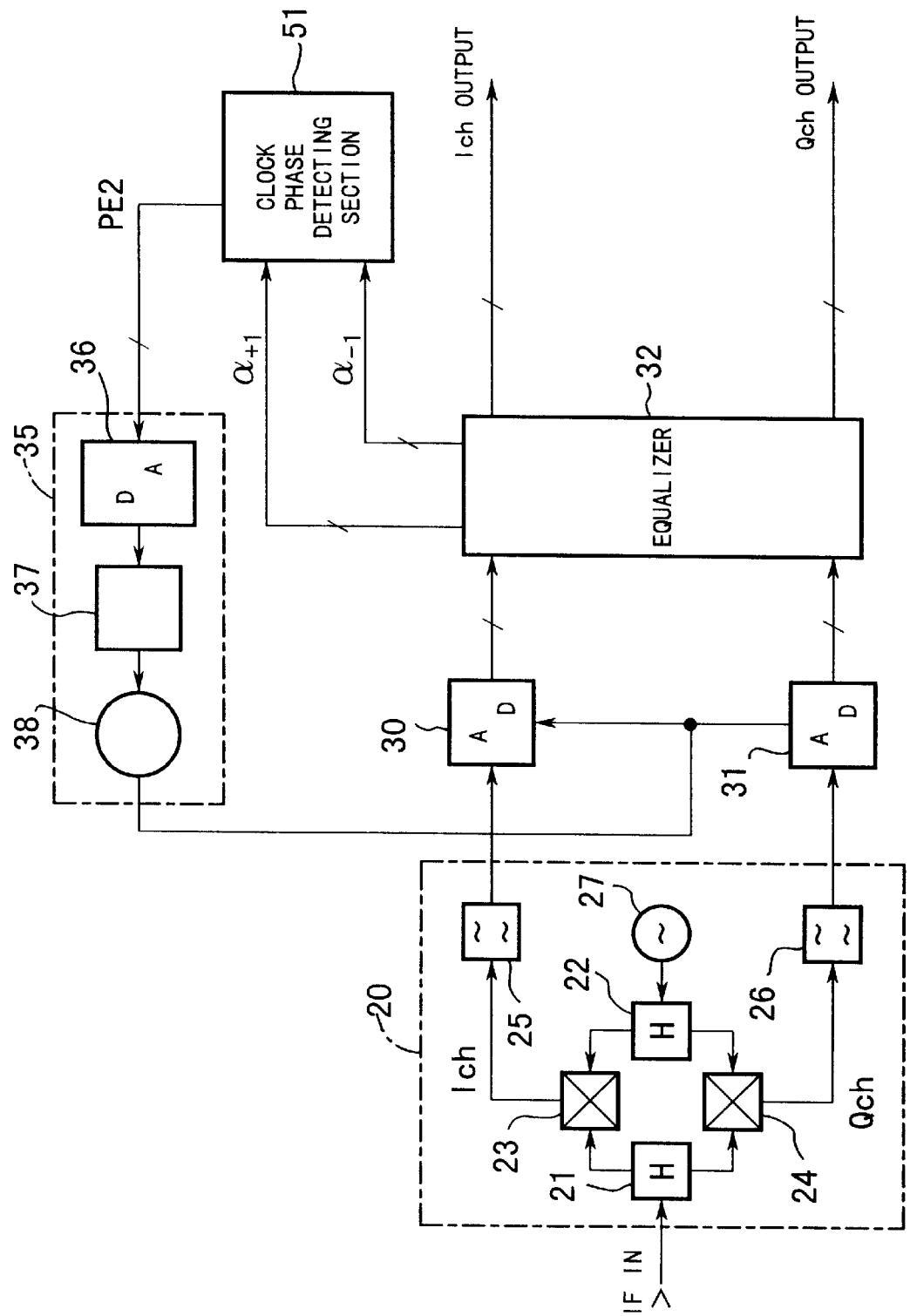
FIG. 12 is a block diagram showing the arrangement of a receiving section of a multiplex radio apparatus according to a sixth embodiment.

FIG. 12 is a block diagram showing the arrangement of a receiving section of a multiplex radio apparatus according to the sixth embodiment. In FIG. 12, the equalizer 32 comprises a transversal equalizer, and tap coefficients $\alpha_{+1}$ and $\alpha_{-1}$ set in the transversal equalizer are acquired and supplied to a clock phase detecting section 51.

Figure 13:
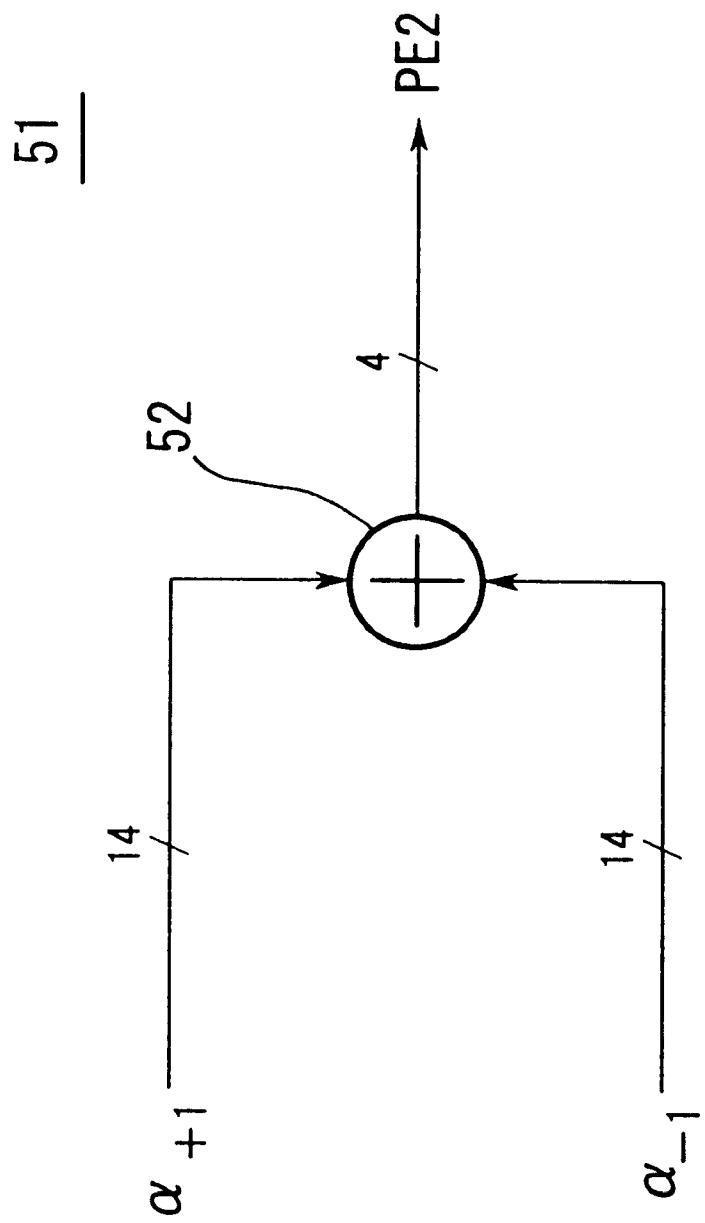
FIG. 13 is a diagram showing the internal arrangement of a clock phase detecting section according to the sixth embodiment.

FIG. 13 is a diagram showing the internal arrangement of the clock phase detecting section 51. The clock phase detecting section 51, which comprises an adder 52, sums up the absolute values of the tap coefficients $\alpha_{+1}$ and $\alpha_{-1}$ and outputs the result to the clock regenerating circuit 35 as a clock phase error signal PE2. Specifically, the adder 52 is supplied with the tap coefficients $\alpha_{+1}$ and $\alpha_{-1}$ each consisting of 14 bits, and the higher four bits of the sum of the tap coefficients are output to the clock regenerating circuit 35. The tap coefficients $\alpha_{+1}$ and $\alpha_{-1}$ are coefficients next to, or immediately succeeding and preceding, a center tap coefficient $\alpha_0$ and have opposite polarities.

Generally, when the phase of the clock signal output from the clock phase detecting section 51 coincides with the phase of the normal signal point, the individual values of the succeeding and preceding tap coefficients of the same stage are zero; on the other hand, when the two phases do not coincide, the succeeding and preceding tap coefficients have values other than zero. Accordingly, one of the succeeding and preceding tap coefficients may be monitored and the clock phase may be adjusted in such a manner that the value of the monitored tap coefficient becomes zero. When phasing is occurring, however, there can arise a situation where although one tap coefficient is zero, the phase of the clock signal is not necessarily coincident with the phase of the normal signal point. Therefore, the phase of the clock signal generated by the clock regenerating circuit 35 is adjusted so that the sum of the absolute values of the tap coefficients $\alpha_{+1}$ and $\alpha_{-1}$ may become zero, whereby the clock phase can be adjusted with accuracy even when phasing is occurring.

Thus, according to the present invention, the clock phase detecting section 51 controls the clock regenerating circuit 35 by using the entirety of the sum input thereto, and the clock phase is controlled so as to cope with the awkward situation caused by phasing; therefore, even when deep phasing is occurring, the phase of the clock signal for the A/D conversion can be quickly and stably corrected.

A seventh embodiment will be now described.

The seventh embodiment is basically identical in arrangement with the sixth embodiment, but the arrangement of the clock phase detecting section 51 partly differs from that of the sixth embodiment. In the following description of the seventh embodiment, identical reference numerals are used to denote identical elements; therefore, for such elements, reference should be made to the description of the sixth embodiment and description thereof is omitted.

Figure 14:
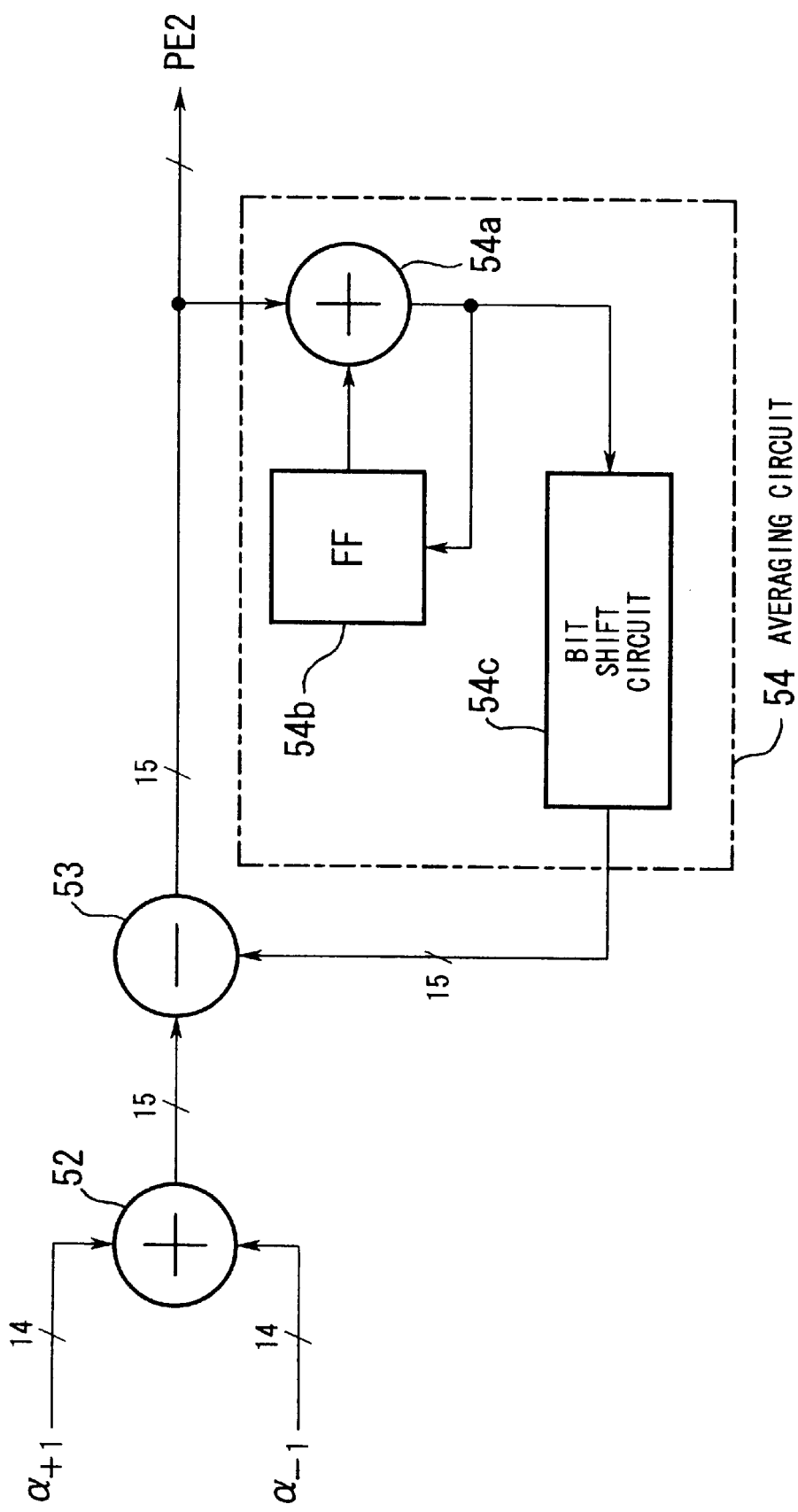
FIG. 14 is a diagram showing the internal arrangement of a clock phase detecting section according to a seventh embodiment.

FIG. 14 is a block diagram showing the internal arrangement of a clock phase detecting section according to the seventh embodiment. In the seventh embodiment, a subtracter 53 and an averaging circuit 54 are additionally provided following the adder 52 used in the sixth embodiment. The averaging circuit 54 comprises an adder 54a, a flip-flop 54b for providing a one-clock delay, and a bit shift circuit 54c, wherein the adder 54a and the flip-flop 54b serve to integrate the output value of the subtracter 53, and the bit shift circuit 54c divides the result of the integration by a value corresponding to a shift amount. Consequently, the averaging circuit 54 averages the output values of the subtracter 53. The subtracter 53 outputs the difference between the average value from the averaging circuit 54 and the output value of the adder 52 to the clock regenerating circuit 35 as the clock phase error signal PE2.

In general, since the equalizer 32 also corrects deviation of the phase of the clock signal for the A/D conversion while the clock regenerating circuit 35 adjusts the clock phase in accordance with the clock phase error signal PE2 output from the clock phase detecting section 51, a double control loop is formed, posing a problem that the clock phase adjustment cannot be stabilized. Therefore, in the seventh embodiment, the subtracter 53 and the averaging circuit 54 are additionally provided so as to adjust the clock phase at a control speed slower than that of the equalizer 32, whereby the clock phase adjustment can be stabilized.

An eighth embodiment will be now described.

The eighth embodiment is a combination of the second embodiment shown in FIG. 7 and the seventh embodiment shown in FIG. 14. Therefore, in the arrangement of the eighth embodiment, identical reference numerals are used to denote identical elements appearing in the second and seventh embodiments, and description of such elements is omitted.

Figure 15:
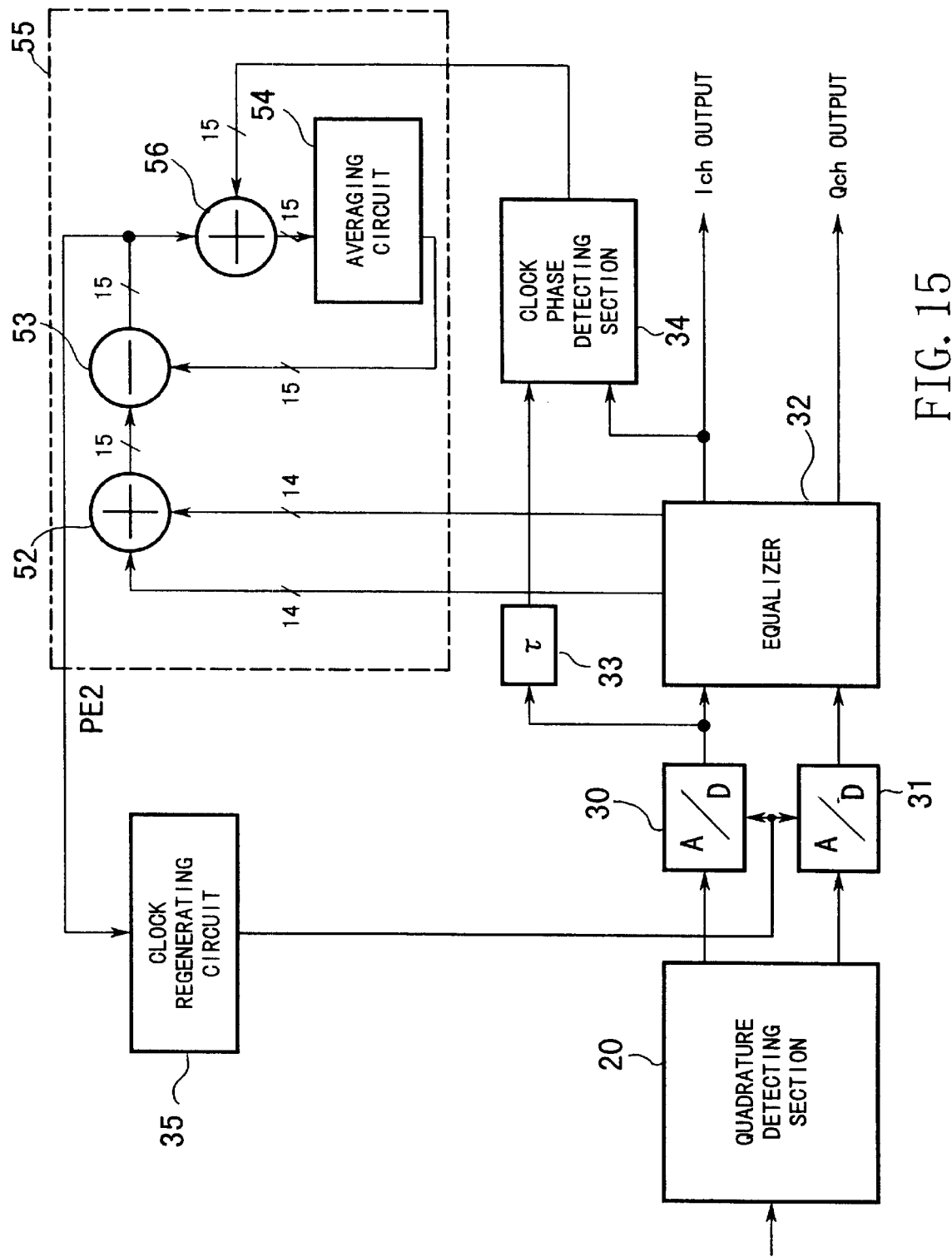
FIG. 15 is a block diagram showing the arrangement of a receiving section of a multiplex radio apparatus according to an eighth embodiment.

FIG. 15 is a block diagram showing the arrangement of a receiving section of a multiplex radio apparatus according to the eighth embodiment. In the eighth embodiment, two clock phase detecting sections 34 and 55 are provided. The clock phase detecting section 34 is identical in arrangement and in operation with the clock phase detecting section 34 of the second embodiment. The clock phase detecting section 55 has an arrangement almost similar to that of the clock phase detecting section 51 of the seventh embodiment; more specifically, the two are the same except that another adder 56 is connected between the output of the subtracter 53 and the input of the averaging circuit 54. The adder 56 is supplied with the output value PE of the differentiating circuit 43 of the clock phase detecting section 34 or with the output value ($E^2 \times PE$) of the coefficient multiplying circuit 44 of the detecting section 34 in multibit form. The output value PE2 of the subtracter 53 is supplied to the clock regenerating circuit 35, as in the seventh embodiment.

Thus, the output value PE or ($E^2 \times PE$) obtained by the clock phase detecting section 34 in the second embodiment is subjected to addition by the adder 56, whereby the stability of the clock phase control against phasing can be improved as compared with the seventh embodiment.

A ninth embodiment will be now described.

The ninth embodiment is a combination of the first embodiment shown in FIG. 3 and the sixth embodiment shown in FIG. 12. Therefore, in the arrangement of the ninth embodiment, identical reference numerals are used to denote identical elements appearing in the first and sixth embodiments, and description of such elements is omitted.

Figure 16:
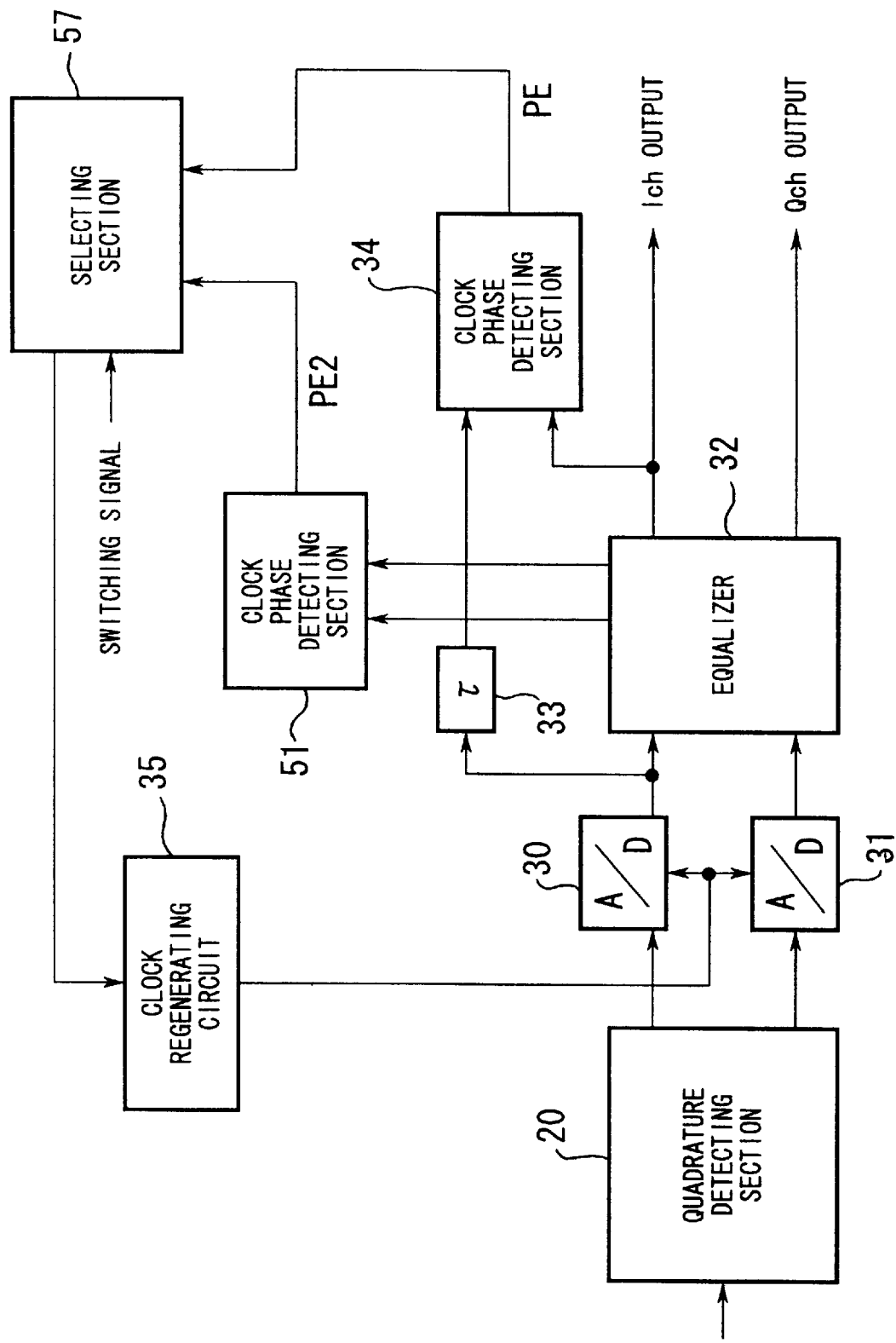
FIG. 16 is a block diagram showing the arrangement of a receiving section of a multiplex radio apparatus according to a ninth embodiment.

FIG. 16 is a block diagram showing the arrangement of a receiving section of a multiplex radio apparatus according to the ninth embodiment. In the ninth embodiment, a selecting section 57 is provided which is supplied with the clock phase error signal PE, which is the output of the clock phase detecting section 34 in the first embodiment, as well as with the clock phase error signal PE2, which is the output of the clock phase detecting section 51 in the sixth embodiment. Also, a switching signal which is generated based on a signal indicative of the synchronized/unsynchronized state of a DEM synchronizing signal or the like is input to the selecting section 57. In accordance with the switching signal, the selecting section 57 selects the clock phase error signal PE and outputs the same to the clock regenerating circuit 35 at the time of pulling into synchronism, and selects the clock phase error signal PE2 and outputs the same to the clock regenerating circuit 35 while synchronism is achieved.

In the case where the clock phase error signal PE is used, the clock phase converges to an optimum position quickly but with low accuracy. On the other hand, where the clock phase error signal PE2 is used, the clock phase converges to an optimum position slowly but with high accuracy. Therefore, the clock phase error signal PE is selected at the time of pulling into synchronism, that is, when convergence should be attained as soon as possible even at the cost of accuracy, and the clock phase error signal PE2 is selected while synchronism is achieved, that is, when high accuracy is required.

In the ninth embodiment, the selecting section 57 is supplied with the clock phase error signal PE, which is the output of the clock phase detecting section 34 in the first embodiment, and with the clock phase error signal PE2, which is the output of the clock phase detecting section 51 in the sixth embodiment. Alternatively, the clock phase error signal PE output from the clock phase detecting section 34 of any one of the second through fifth embodiments may be used as the clock phase error signal PE, and the clock phase error signal PE2 output from the clock phase detecting section 51 in the seventh embodiment may be used as the clock phase error signal PE2.

A tenth embodiment will be now described.

Figure 17:
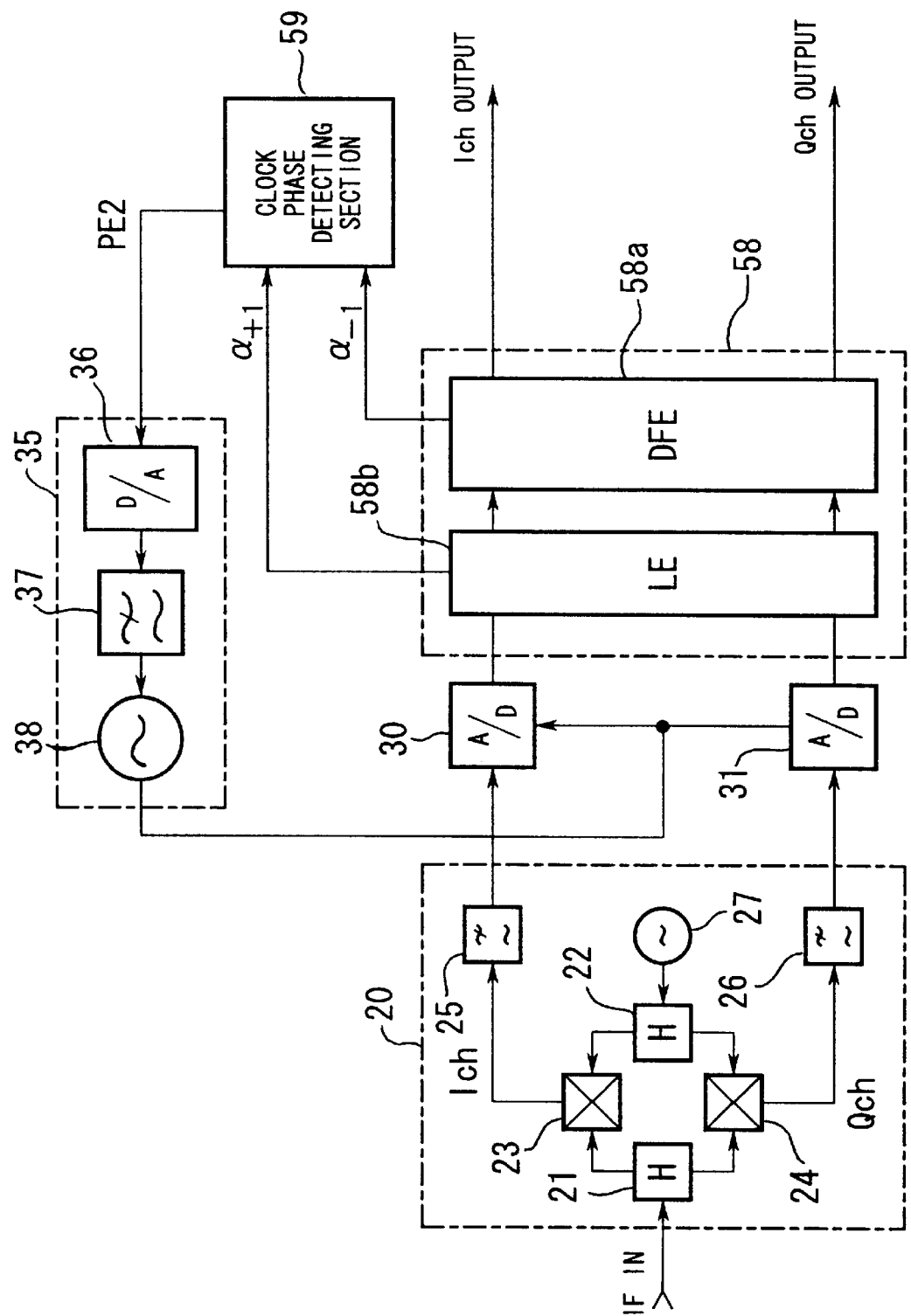
FIG. 17 is a block diagram showing the arrangement of a receiving section of a multiplex radio apparatus according to a tenth embodiment.

FIG. 17 is a block diagram showing the arrangement of a receiving section of a multiplex radio apparatus according to the tenth embodiment. The arrangement of the tenth embodiment is basically identical with that of the sixth embodiment shown in FIG. 12; therefore, identical reference numerals are used to denote identical elements and description of such elements is omitted.

The tenth embodiment differs from the sixth embodiment in the arrangement of an equalizer 58 and a clock phase detecting section 59. Specifically, the equalizer 58 comprises a decision feedback equalizer (DFE) 58a and a linear equalizer (LE) 58b. The decision feedback equalizer 58a has a structure capable of providing a succeeding tap alone, and thus the linear equalizer 58b is provided to supplement a preceding tap. Tap coefficients $\alpha_{+1}$ and $\alpha_{-1}$ are acquired from the equalizer 58 having the arrangement mentioned above, and are supplied to the clock phase detecting section 59. The equalizer 58 constructed as above has a characteristic such that the absolute value of the succeeding tap coefficient (positive-side coefficient) increases due to the occurrence of minimum phase transition type phasing, which causes an imbalance of magnitude between the absolute values of the tap coefficients $\alpha_{+1}$ and $\alpha_{-1}$ during the occurrence of minimum phase transition type phasing.

Figure 18:
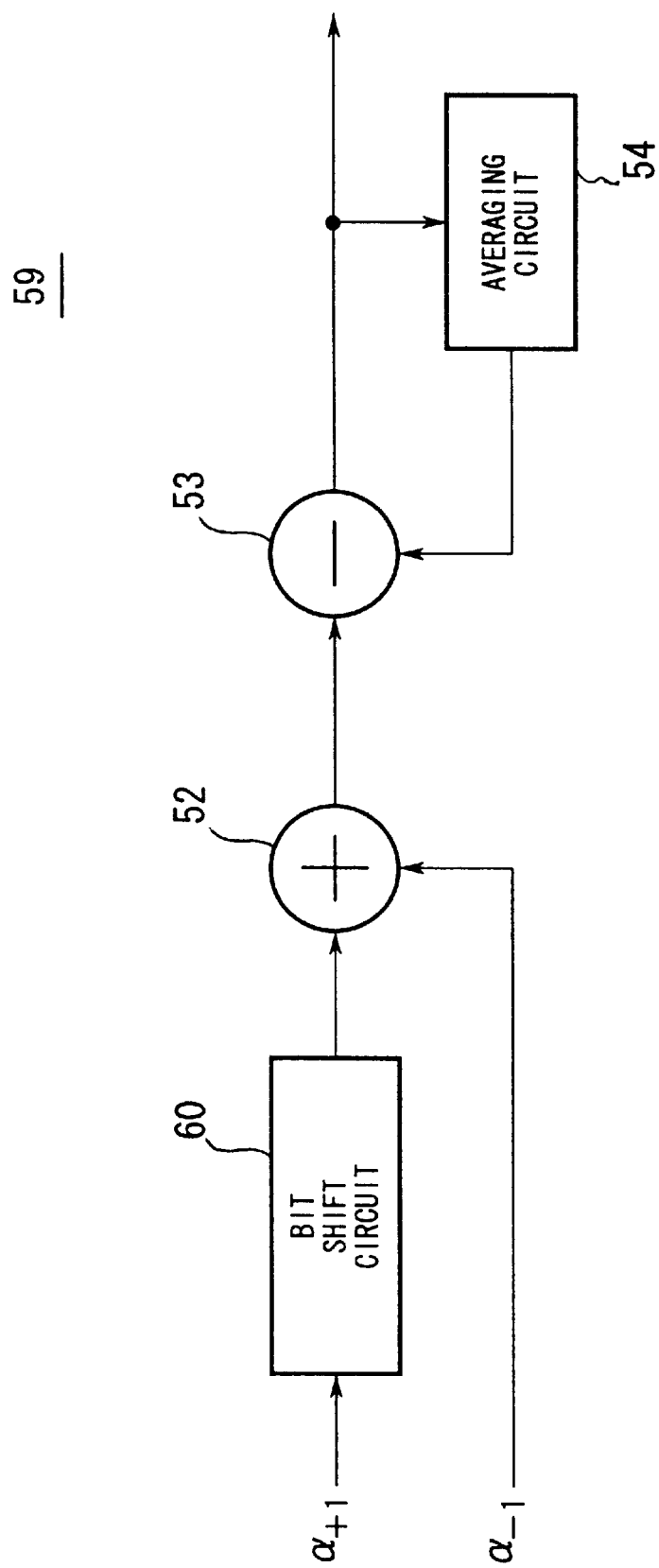
FIG. 18 is a block diagram showing the internal arrangement of a clock phase detecting section according to the tenth embodiment.

FIG. 18 is a block diagram showing the internal arrangement of the clock phase detecting section 59. This arrangement is basically identical with that of the clock phase detecting section 51 of the seventh embodiment shown in FIG. 14; therefore, identical reference numerals are used to denote identical elements and description of such elements is omitted.

The clock phase detecting section 59 of the tenth embodiment additionally includes a bit shift circuit 60. If minimum phase transition type phasing occurs, the absolute value of the tap coefficient $\alpha_{+1}$ becomes greater than that of the tap coefficient $\alpha_{-1}$ and thus the balance of the two absolute values is lost, as mentioned above. Therefore, the bit shift circuit 60 divides the tap coefficient $\alpha_{+1}$ by a value corresponding to the bit shift amount, to thereby ensure the balance of the two tap coefficients $\alpha_{+1}$ and $\alpha_{-1}$.

An eleventh embodiment will be now described.

The eleventh embodiment is basically identical in arrangement with the tenth embodiment; therefore, identical reference numerals are used to denote identical elements and description of such elements is omitted.

Figure 19:
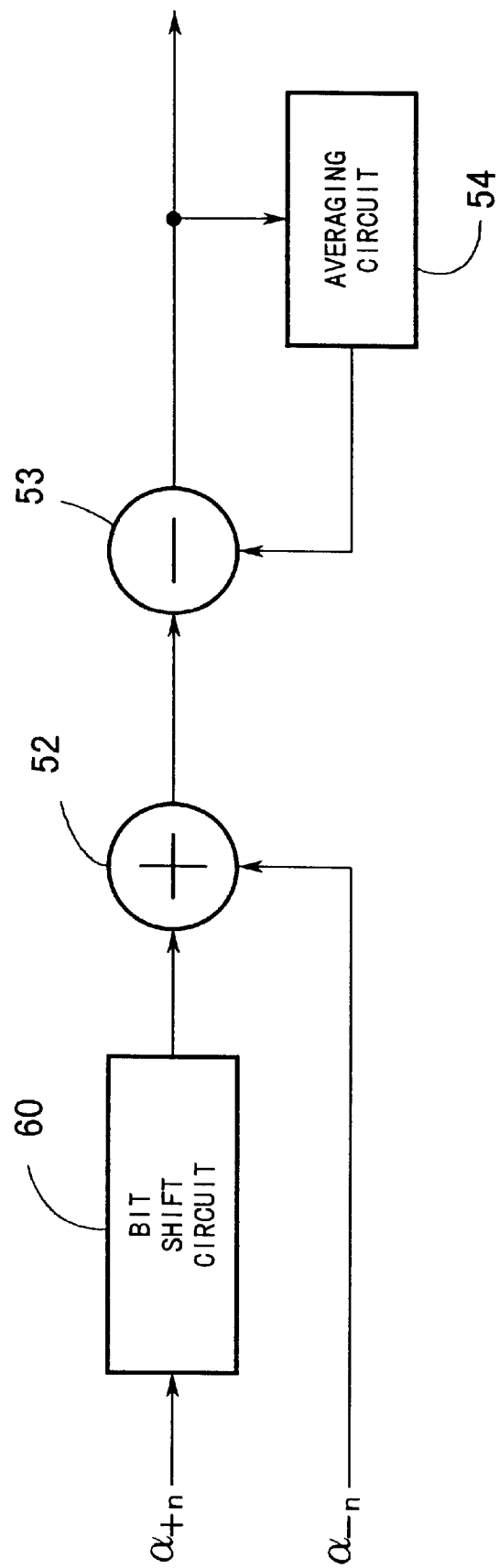
FIG. 19 is a block diagram showing the internal arrangement of a clock phase detecting section according to an eleventh embodiment.

FIG. 19 is a block diagram showing the internal arrangement of the clock phase detecting section 59 according to the eleventh embodiment. The eleventh embodiment differs from the tenth embodiment in that different tap coefficients are input to the clock phase detecting section 59; namely, in the eleventh embodiment, tap coefficients $\alpha_{+n}$ and $\alpha_{-n}$ are input. Symbol n represents an integer greater than or equal to "2", and thus this embodiment does not use the tap coefficients $\alpha_{+1}$ and $\alpha_{-1}$ immediately succeeding and preceding the center tap coefficient $\alpha_0$, but uses tap coefficients remoter from the center tap coefficient $\alpha_0$. The tap coefficients $\alpha_{+n}$ and $\alpha_{-n}$ remote from the center tap coefficient $\alpha_0$ are associated with an Ich signal at a position on the eye pattern remote from the normal signal point, and by using the tap coefficients $\alpha_{+n}$ and $\alpha_{-n}$, it is possible to enhance the accuracy of the clock phase correction. This advantage is more conspicuous during phasing.

A twelfth embodiment will be now described.

The arrangement of the twelfth embodiment is basically identical with that of the tenth embodiment; therefore, identical reference numerals are used to denote identical elements and description of such elements is omitted.

Figure 20:
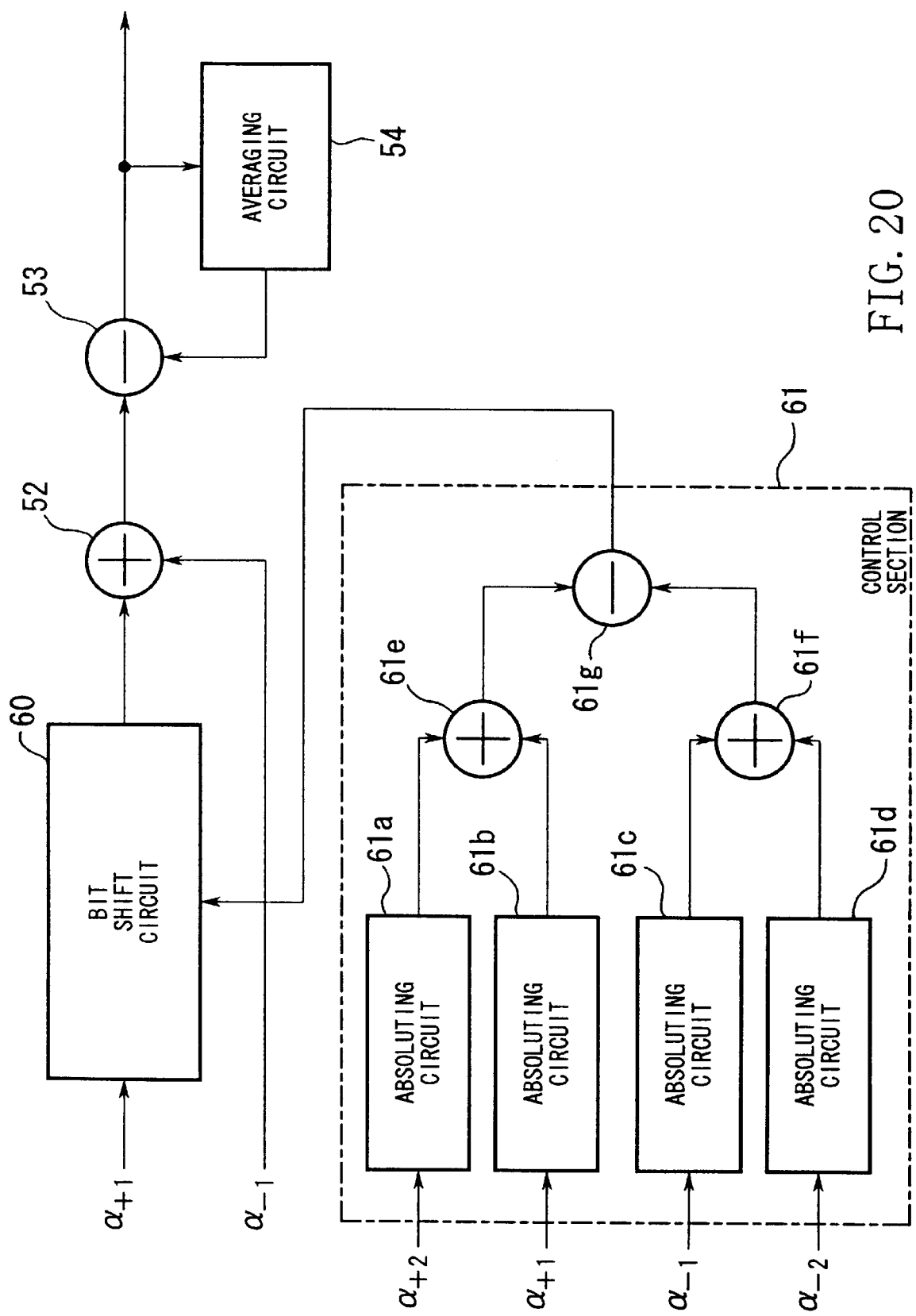
FIG. 20 is a block diagram showing the internal arrangement of a clock phase detecting section according to a twelfth embodiment.

FIG. 20 is a block diagram showing the internal arrangement of the clock phase detecting section 59 according to the twelfth embodiment. In the twelfth embodiment, a control section 61 is additionally provided. The control section 61 is supplied with tap coefficients $\alpha_{+2}$, $\alpha_{+1}$, $\alpha_{-1}$ and $\alpha_{-2}$, and the output of the control section 61 is supplied to the bit shift circuit 60. The control section 61 comprises absolutizing circuits 61a to 61d, adders 61e and 61f, and a subtracter 61g. The tap coefficients $\alpha_{+2}$ and $\alpha_{+1}$ are converted into respective absolute values by the absolutizing circuits 61a and 61b, respectively, and these absolute values are added up by the adder 61e, the result being supplied to the subtracter 61g. Similarly, the tap coefficients $\alpha_{-1}$ and $\alpha_{-2}$ are converted into respective absolute values by the absolutizing circuits 61c and 61d, respectively, and these absolute values are added up by the adder 61f, the result being supplied to the subtracter 61g. The subtracter 61g subtracts the output value of the adder 61f from the output value of the adder 61e, and supplies the value obtained to the bit shift circuit 60 as a control signal. If the control signal indicates zero, the bit shift circuit 60 directly outputs the tap coefficient $\alpha_{+1}$, without performing a bit shift operation, and if the control signal indicates a positive value, that is, if the sum of the absolute values of the tap coefficients $\alpha_{+2}$ and $\alpha_{+1}$ is greater than the sum of the absolute values of the tap coefficients $\alpha_{-1}$ and $\alpha_{-2}$, the bit shift circuit 60 performs a bit shift operation to thereby decrease the tap coefficient $\alpha_{+1}$.

Generally, if minimum phase transition type phasing occurs, the absolute value of the succeeding tap coefficient (positive-side coefficient) increases, whereas if nonminimum-phase-transition type phasing occurs, the absolute value of the preceding tap coefficient (negative-side coefficient) increases. In such cases, the clock phase cannot be corrected accurately by the clock phase control using the sum of the absolute values of the tap coefficients $\alpha_{+1}$ and $\alpha_{-1}$ alone. Therefore, when the occurrence of minimum phase transition type phasing is detected, the bit shift circuit 60 is operated so as to ensure the balance of the tap coefficients $\alpha_{+1}$ and $\alpha_{-1}$.

A thirteenth embodiment will be now described.

The arrangement of the thirteenth embodiment is basically identical with that of the tenth embodiment; therefore, identical reference numerals are used to denote identical elements and description of such elements is omitted.

Figure 21:
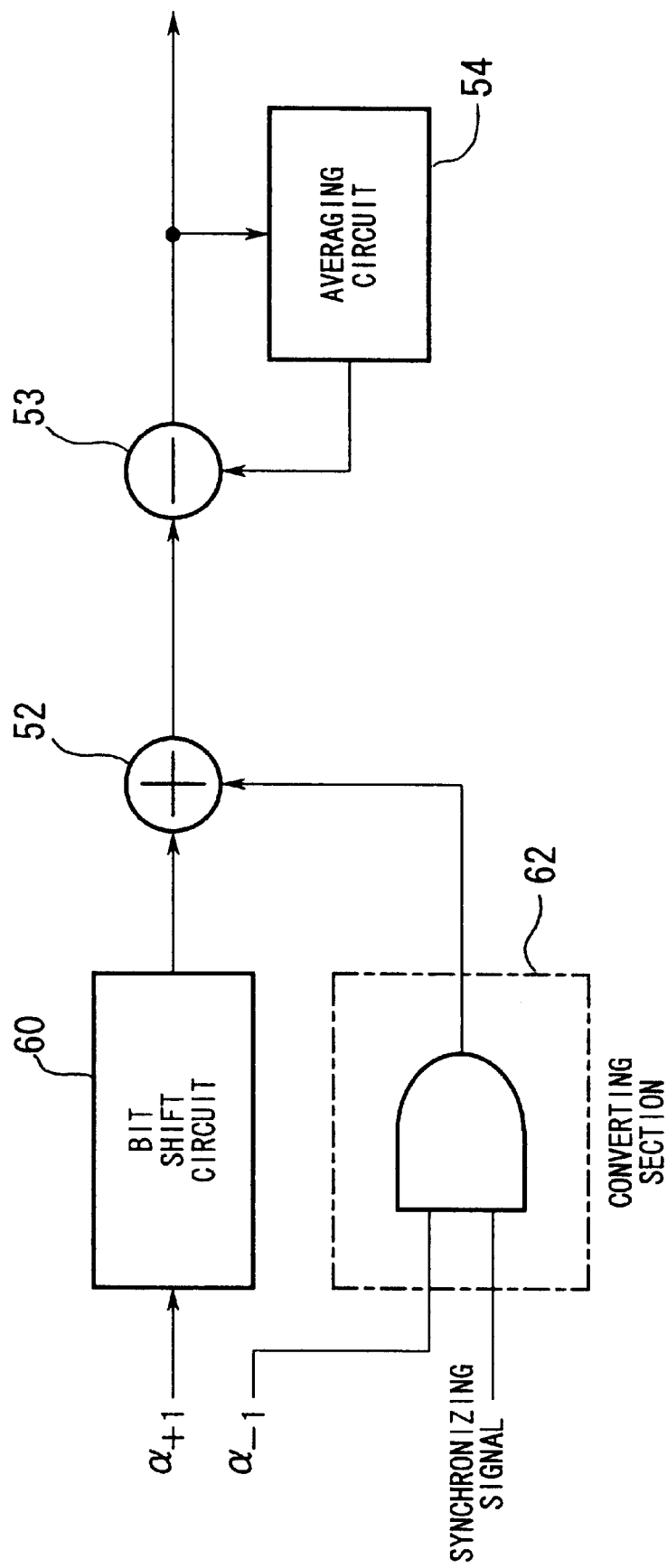
FIG. 21 is a block diagram showing the internal arrangement of a clock phase detecting section according to a thirteenth embodiment.

FIG. 21 is a block diagram showing the internal arrangement of the clock phase detecting section 59 according to the thirteenth embodiment. The thirteenth embodiment additionally includes a converting section 62. The converting section 62, which comprises an AND circuit, is supplied with the tap coefficient $\alpha_{-1}$ and a synchronizing signal, and provides an output to the adder 52. Namely, while synchronism is achieved, the tap coefficient $\alpha_{-1}$ is supplied to the adder 52, as in the tenth embodiment, whereas when synchronism is not achieved such as at the time of pulling into synchronism, the tap coefficient $\alpha_{-1}$ is not supplied to the adder 52, but a signal "0" is output to the adder 52. Consequently, while synchronism is not achieved such as at the time of pulling into synchronism, only one of the tap coefficients is monitored and the clock phase is controlled so that the monitored value may become zero, whereby synchronism can be established in a short time. In the equalizer 58 constituted by the decision feedback equalizer 58a and the linear equalizer 58b, the tap coefficient $\alpha_{+1}$ provided by the decision feedback equalizer 58a converges faster than the tap coefficient $\alpha_{-1}$ provided by the linear equalizer 58b; therefore, while synchronism is not achieved, the tap coefficient $\alpha_{+1}$ alone is monitored and the clock phase control is performed in such a manner that the monitored value becomes zero.

A fourteenth embodiment will be now described.

Figure 24:
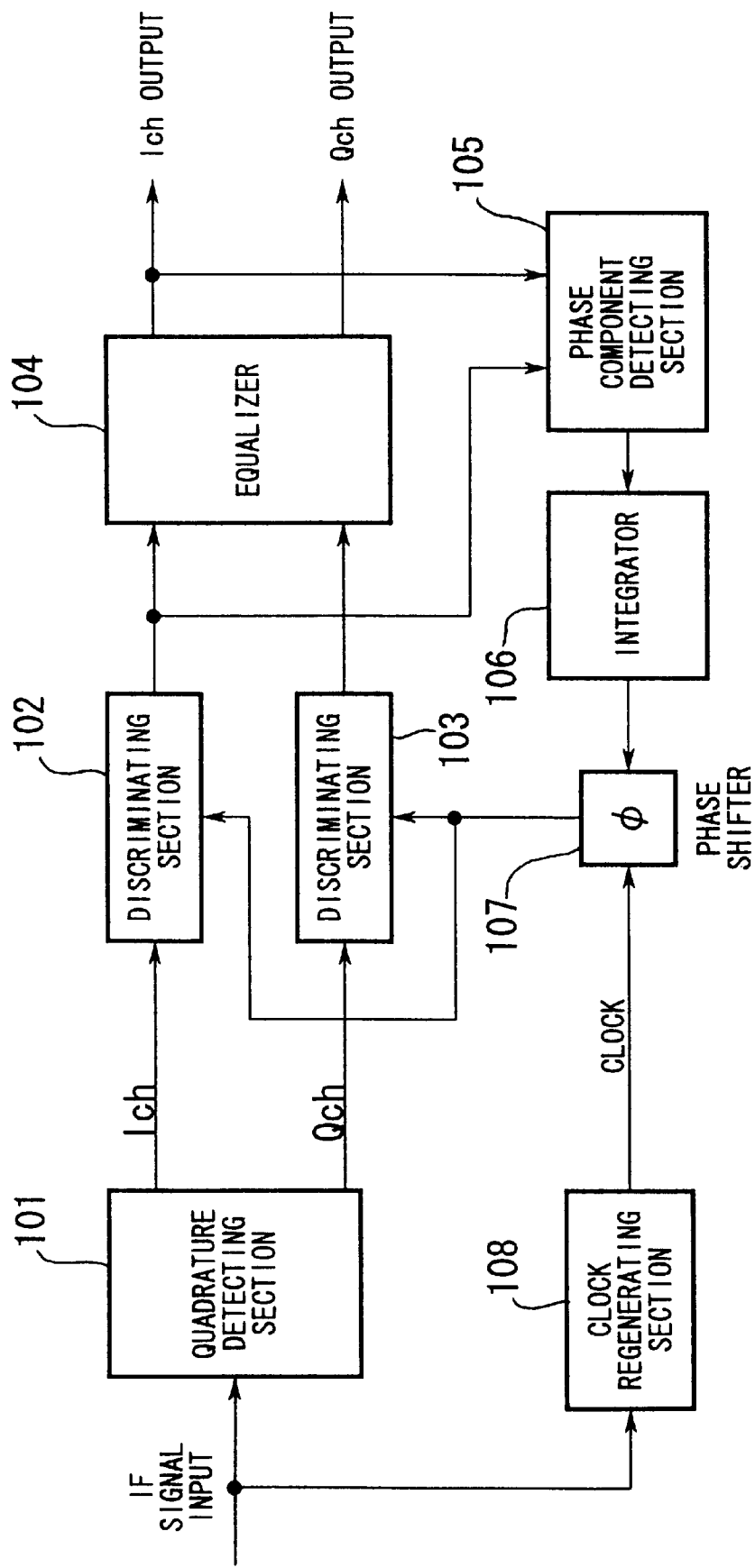
FIG. 24 is a block diagram showing the arrangement of a receiving section of a conventional multiplex radio apparatus.
Figure 25:
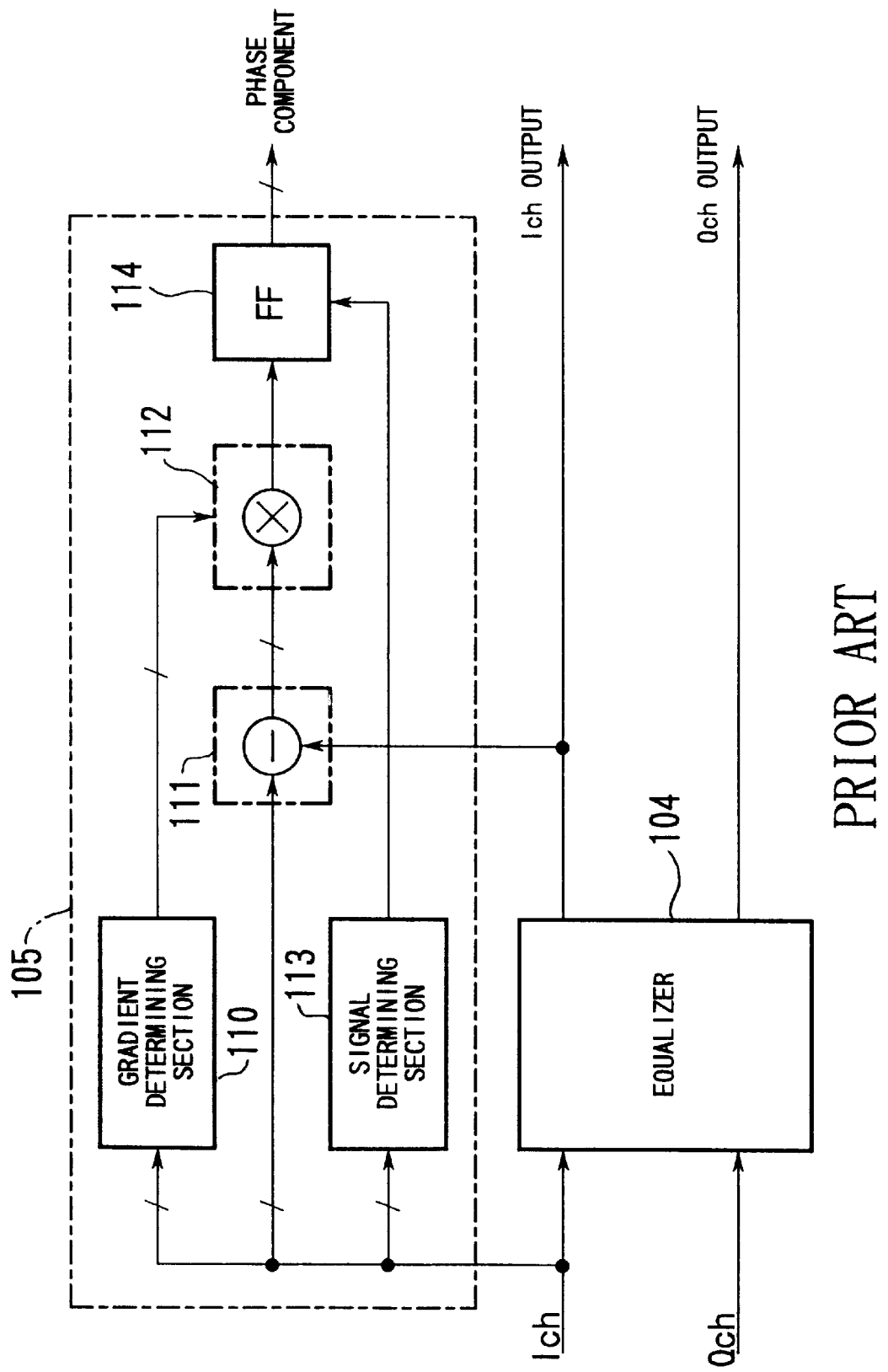
FIG. 25 is a block diagram showing the internal arrangement of a conventional clock phase detecting section.

The fourteenth embodiment employs a receiving section which is identical in arrangement with that of the multiplex radio apparatus shown in FIG. 24.

Figure 22:
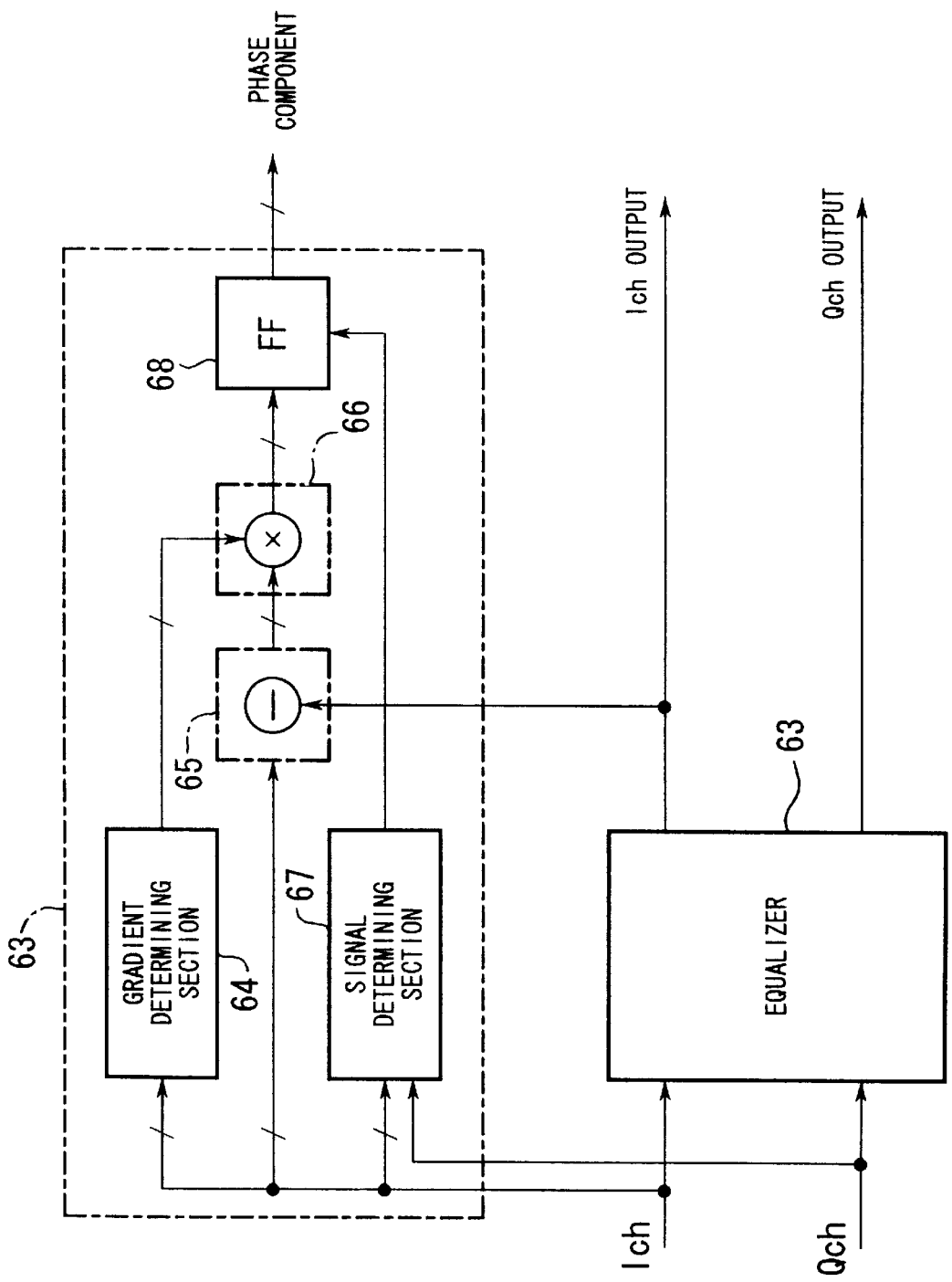
FIG. 22 is a block diagram showing the internal arrangement of a clock phase detecting section according to a fourteenth embodiment.

FIG. 22 is a block diagram showing the internal arrangement of the clock phase detecting section according to the fourteenth embodiment. In FIG. 24, a gradient determining section 64 detects the gradient of the Ich signal, that is, it determines whether the Ich signal is increasing or decreasing with time. An error detecting section 65 comprises a subtracter and calculates the difference between the Ich signals input to and output from an equalizer 63 to thereby detect the error between the input and output signals to and from the equalizer 63. A clock phase computing section 66, which comprises a multiplier, multiplies the output of the gradient determining section 64 by the output of the error detecting section 65, and outputs the result as phase deviation information (phase component) for the A/D conversion clock signal. A signal determining section 67 is supplied with the Ich and Qch signals which are not yet input to the equalizer 63, and determines whether or not the phase deviation information (phase component) output from the clock phase computing section 66 is reliable information. This will be described in detail later with reference to FIG. 23.

A selecting section 68 comprises a flip-flop. Only when it is judged by the signal determining section 67 that the phase deviation information (phase component) output from the clock phase computing section 66 is reliable information, the selecting section 68 outputs this phase deviation information; otherwise, it outputs the previous phase deviation information.

Figure 23:
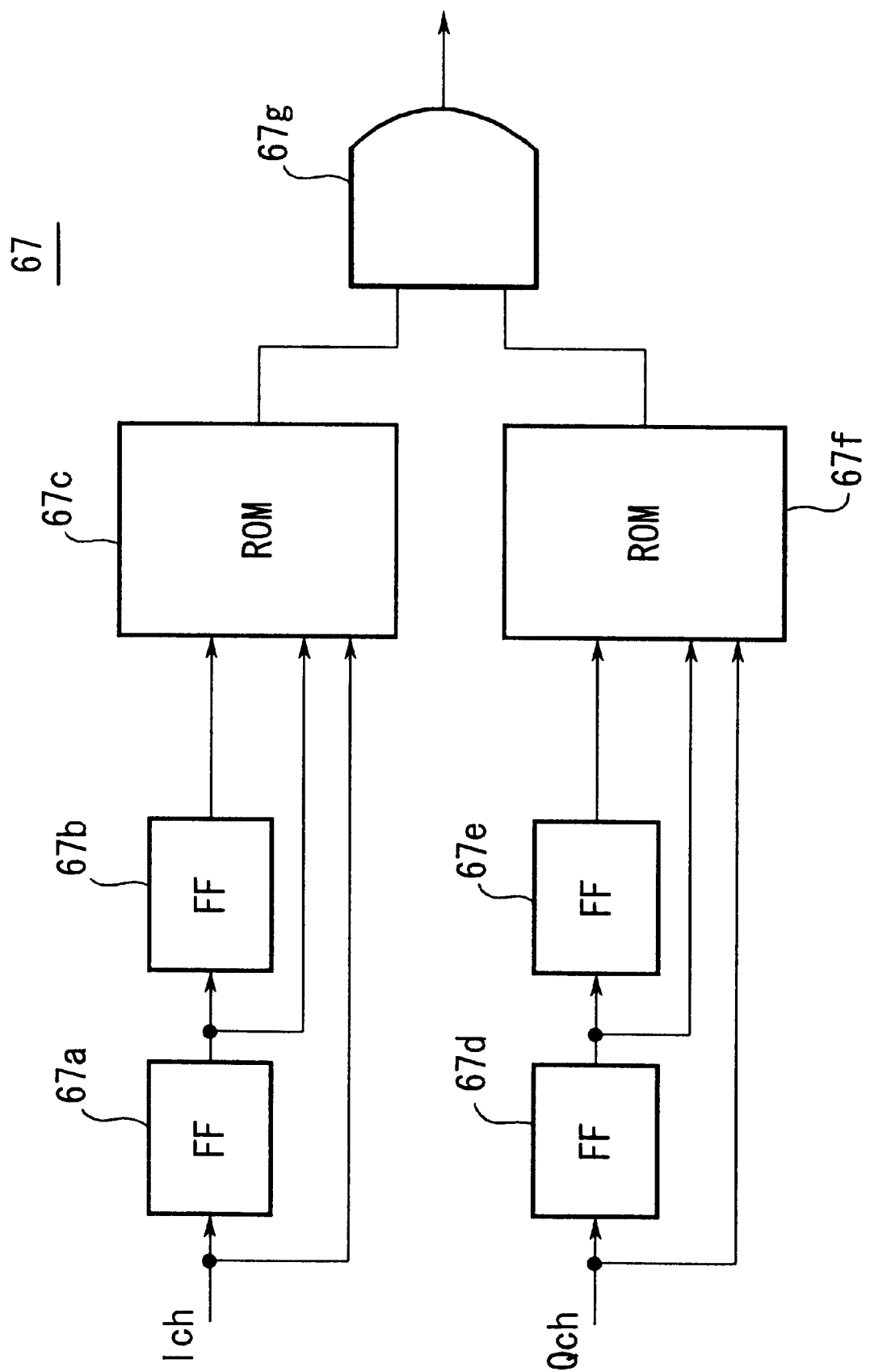
FIG. 23 is a block diagram showing the internal arrangement of a signal determining section according to the fourteenth embodiment.

FIG. 23 is a block diagram showing the internal arrangement of the signal determining section 67. As shown in FIG. 23, the Ich input signal is supplied to a ROM 67c directly and via two flip-flops 67a and 67b. The flip-flops 67a and 67b each provide a one-clock signal delay, and therefore, the ROM 67c is supplied with the Ich signal values of three consecutive clock timings. Based on these input signals, the ROM 67c determines whether the Ich signal is monotonously and steeply increasing or is monotonously and steeply decreasing, and outputs a signal "1" to an AND circuit 67g when the Ich signal is monotonously and steeply increasing or decreasing. Similarly, the Qch input signal is supplied to a ROM 67f directly and via two flip-flops 67d and 67e. Each of the flip-flops 67d and 67e also provides a one-clock signal delay, and thus the ROM 67f is supplied with the Qch signal values of three consecutive clock timings. Based on these input signals, the ROM 67f determines whether the Qch signal is monotonously and steeply increasing or is monotonously and steeply decreasing, and outputs a signal "1" to the AND circuit 67g when the Qch signal is monotonously and steeply increasing or decreasing.

Namely, phasing induces quadrature interference, and the clock phase cannot be corrected with accuracy if the state of the Ich signal alone is monitored. Therefore, the state of the Qch signal also is monitored, and the selecting section 68 is controlled in accordance with the result of monitoring of the two signals. Only when the Ich signal is monotonously and steeply increasing or decreasing and at the same time the Qch signal is monotonously and steeply increasing or decreasing, the AND circuit 67g outputs the signal "1" to the selecting section 68, so that the reliable phase deviation information (phase component) output from the clock phase computing section 66 is supplied to the clock regenerating section to be used for adjusting the phase of the clock signal for the A/D conversion.

As described above, according to the present invention, the difference detecting means detects the difference between the input and output signals to and from the equalizing circuit, and this difference is squared or is converted to an absolute value. While monitoring the value thus obtained, the phase adjusting means controls the clock regenerating circuit to thereby adjust the phase of the clock signal output from the clock regenerating circuit.

Thus, the clock regenerating circuit is controlled by using the entirety of the difference detected by the difference detecting means; therefore, even when deep phasing is occurring, the phase of the A/D conversion clock signal supplied to the A/D converting circuits can be quickly and stably corrected.

Also, the summing means acquires the two predetermined tap coefficients from the equalizing circuit and sums up the absolute values of the tap coefficients. While monitoring the sum thus obtained, the phase adjusting means controls the clock regenerating circuit so as to adjust the phase of the clock signal output therefrom.

Thus, the clock regenerating circuit is controlled by using the sum of the absolute values of the two predetermined tap coefficients obtained from the equalizing circuit, that is, by using the entirety of the sum obtained. Therefore, even when deep phasing is occurring, the phase of the A/D conversion clock signal supplied to the A/D converting circuits can be quickly and stably corrected.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A clock phase detecting circuit provided in a receiving section of a multiplex radio apparatus which includes a clock regenerating circuit for regenerating a clock signal, an A/D converting circuit for converting a multilevel quadrature demodulated signal to a digital value in accordance with timing of the clock signal supplied from the clock regenerating circuit, and an equalizing circuit for performing an equalization process on the digital value output from the A/D converting circuit, said clock phase detecting circuit comprising:

difference detecting means for detecting a difference between input and output signals to and from the equalizing circuit;

squaring means for squaring the difference detected by said difference detecting means; and phase adjusting means for adjusting the phase of the clock signal output from the clock regenerating circuit in such a manner that an output value from said squaring means is minimized.

2. The clock phase detecting circuit according to claim 1, wherein said phase adjusting means includes differentiating means for obtaining a differential of the output value of said squaring means with respect to clock phase change, and adjusting means for adjusting the phase of the clock signal output from the clock regenerating circuit in accordance with an output value from said differentiating means.

3. The clock phase detecting circuit according to claim 1, wherein said phase adjusting means includes differentiating means for obtaining a differential of the output value of said squaring means with respect to clock phase change, multiplying means for multiplying an output value from said differentiating means by the output value from said squaring means, and adjusting means for adjusting the phase of the clock signal output from the clock regenerating circuit in accordance with an output value from said multiplying means.

4. A clock phase detecting circuit provided in a receiving section of a multiplex radio apparatus which includes a clock regenerating circuit for regenerating a clock signal, an A/D converting circuit for converting a multilevel quadrature demodulated signal to a digital value in accordance with timing of the clock signal supplied from the clock regenerating circuit, and an equalizing circuit for performing an equalization process on the digital value output from the A/D converting circuit, said clock phase detecting circuit comprising:

difference detecting means for detecting a difference between input and output signals to and from the equalizing circuit;

absolutizing means for converting the difference detected by said difference detecting means to an absolute value; and phase adjusting means for adjusting the phase of the clock signal output from the clock regenerating circuit in such a manner that an output value from said absolutizing means is minimized.

5. The clock phase detecting circuit according to claim 4, wherein said phase adjusting means includes differentiating means for obtaining a differential of the output value of said absolutizing means with respect to clock phase change, and adjusting means for adjusting the phase of the clock signal output from the clock regenerating circuit in accordance with an output value from said differentiating means.

6. The clock phase detecting circuit according to claim 4, wherein said phase adjusting means includes differentiating means for obtaining a differential of the output value of said absolutizing means with respect to clock phase change, multiplying means for multiplying an output value from said differentiating means by the output value from said absolutizing means, and adjusting means for adjusting the phase of the clock signal output from the clock regenerating circuit in accordance with an output value from said multiplying means.

* * * * *